(12) United States Patent
Bradbury et al.

(10) Patent No.: US 10,228,946 B2
(45) Date of Patent: *Mar. 12, 2019

(54) READING A REGISTER PAIR BY WRITING A WIDE REGISTER

(71) Applicant: INTERNATIONAL BUSINESS MACHINES CORPORATION, Armonk, NY (US)

(72) Inventors: Jonathan D. Bradbury, Poughkeepsie, NY (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 819 days.

This patent is subject to a terminal disclaimer.

(21) Appl. No.: 14/550,970

(22) Filed: Nov. 22, 2014

(65) Prior Publication Data

US 2015/0121047 A1 Apr. 30, 2015

Related U.S. Application Data

(63) Continuation of application No. 14/068,725, filed on Oct. 31, 2013.

(51) Int. Cl.
*G06F 9/30* (2018.01)
*G06F 9/38* (2018.01)

(52) U.S. Cl.
CPC ...... *G06F 9/30181* (2013.01); *G06F 9/30098* (2013.01); *G06F 9/30109* (2013.01); *G06F 9/30112* (2013.01); *G06F 9/383* (2013.01)

(58) Field of Classification Search
CPC .................................................. G06F 9/30112
See application file for complete search history.

(56) References Cited

U.S. PATENT DOCUMENTS

| 5,551,013 | A | 8/1996 | Beausoleil et al. |
| 5,574,873 | A | 11/1996 | Davidian |
| 5,790,825 | A | 8/1998 | Traut |

(Continued)

FOREIGN PATENT DOCUMENTS

EP 2302510 A1 3/2011

OTHER PUBLICATIONS

Office Action for U.S. Appl. No. 14/068,725 dated Jan. 31, 2017, pp. 1-18.

(Continued)

*Primary Examiner* — Jacob Petranek
(74) *Attorney, Agent, or Firm* — Steven Chiu, Esq.; Blanche E. Schiller, Esq.; Heslin Rothenberg Farley & Mesiti P.C.

(57) ABSTRACT

A read operation is initiated to obtain a wide input operand. Based on the initiating, a determination is made as to whether the wide input operand is available in a wide register or in two narrow registers. Based on determining the wide input operand is not available in the wide register, merging at least a portion of contents of the two narrow registers to obtain merged contents, writing the merged contents into the wide register, and continuing the read operation to obtain the wide input operand. Based on determining the wide input operand is available in the wide register, obtaining the wide input operand from the wide register.

8 Claims, 23 Drawing Sheets

(56) References Cited

U.S. PATENT DOCUMENTS

| | | | |
|---|---|---|---|
| 5,790,827 A * | 8/1998 | Leung | G06F 9/3836 |
| | | | 712/216 |
| 6,009,261 A | 12/1999 | Scalzi et al. | |
| 6,094,719 A * | 7/2000 | Panwar | G06F 9/30014 |
| | | | 708/513 |
| 6,308,255 B1 | 10/2001 | Gorishek, IV et al. | |
| 6,381,691 B1 | 4/2002 | Altman et al. | |
| 6,463,525 B1 | 10/2002 | Prabhu | |
| 2007/0260855 A1 | 11/2007 | Gschwind et al. | |
| 2010/0268919 A1 * | 10/2010 | Chaudhry | G06F 9/30098 |
| | | | 712/210 |
| 2010/0274961 A1 * | 10/2010 | Golla | G06F 9/384 |
| | | | 711/108 |
| 2010/0274992 A1 * | 10/2010 | Chou | G06F 9/30032 |
| | | | 712/216 |
| 2010/0274994 A1 * | 10/2010 | Golla | G06F 9/30032 |
| | | | 712/216 |
| 2011/0320765 A1 | 12/2011 | Karkhanis et al. | |
| 2012/0110305 A1 * | 5/2012 | Lien | G06F 9/3012 |
| | | | 712/200 |

OTHER PUBLICATIONS

International Search Report and Written Opinion for PCT/EP2014/071905 dated Jan. 28, 2015, pp. 1-12.
"z/Architecture Principles of Operation," IBM® Publication No. SA22-7832-09, Tenth Edition, Sep. 2012, pp. 1-1596.
"Power ISA™ Version 2.06 Revision B," International Business Machines Corporation, Jul. 23, 2010, pp. 1-1341.
"Intel® 64 and IA-32 Architectures Developer's Manual: vol. 2B, Instructions Set Reference, A-L," Order No. 253666-041US, Dec. 2011, pp. 1-524.
"Intel® 64 and IA-32 Architectures Developer's Manual: vol. 2B, Instructions Set Reference, M-Z," Order No. 253667-041US, Dec. 2011, pp. 1-550.
Bradbury et al., "Reducing Register Read Ports for Register Pairs," U.S. Appl. No. 13/552,099, filed Jul. 18, 2012, pp. 1-61.
Bradbury et al., "Predicting Register Pairs," U.S. Appl. No. 13/552,108, filed Jul. 18, 2012, pp. 1-60.
Bradbury et al., "Managing Register Pairing," U.S. Appl. No. 13/552,109, filed Jul. 18, 2012, pp. 1-61.
Final Office Action for U.S. Appl. No. 14/068,725 dated May 30, 2017, pp. 1-19.

* cited by examiner

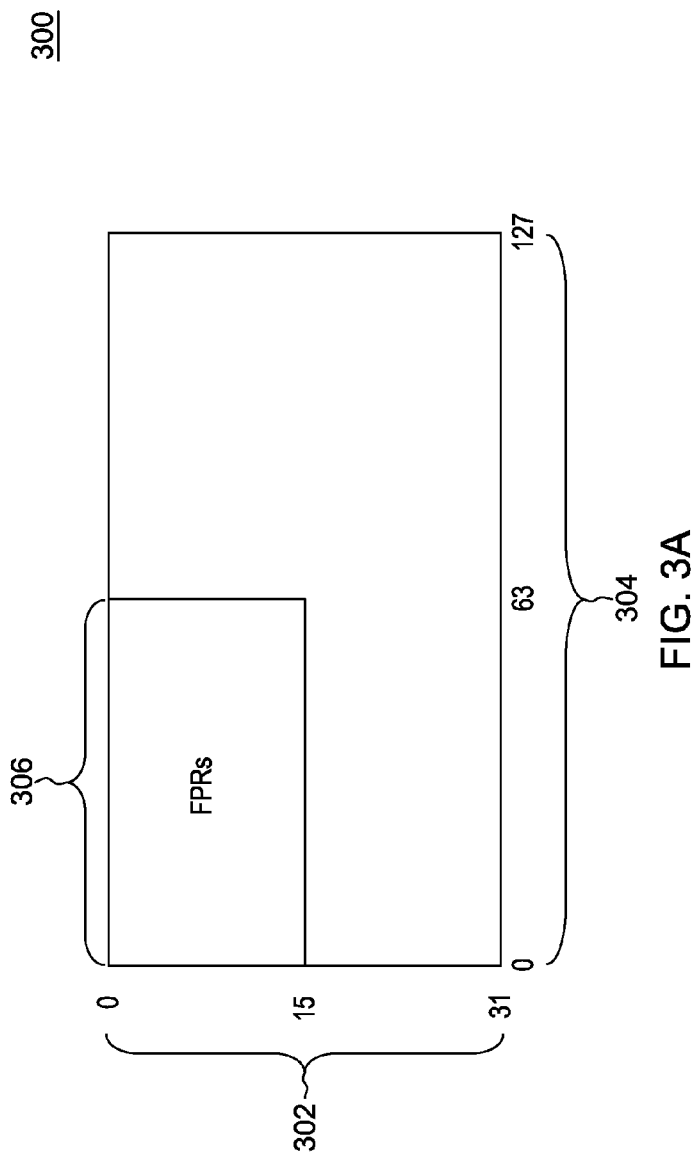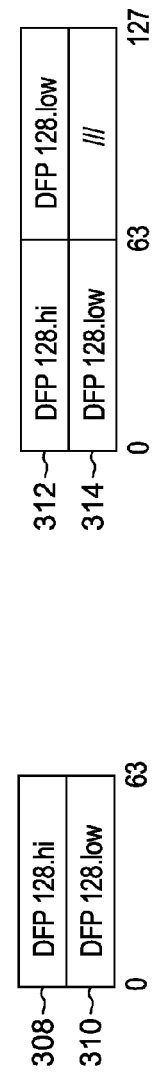

|  | 0 | 1 | 2 | 3 | 4 | 5 | 6 | 7 | 8 | 9 | 10 | 11 | 12 |
|---|---|---|---|---|---|---|---|---|---|---|----|----|----|
| 402—ADD128 | RF | M | EX | EX | EX | CC | WB | | | | | |
| 404—ADD128 | | | | RF | RF | M | EX | EX | EX | CC | WB | |

|  | 0 | 1 | 2 | 3 | 4 | 5 | 6 | 7 | 8 | 9 | 10 | 11 | 12 |
|---|---|---|---|---|---|---|---|---|---|---|----|----|----|
| 410—ADD128 | RF | EX | EX | EX | CC | WB | | | | | | |
| 412—ADD128 | | | | RF | EX | EX | EX | CC | WB | | | |

|   | 0 | 1 | 2 | 3 | 4 | 5 | 6 | 7 |
|---|---|---|---|---|---|---|---|---|
| Y |   |   |   |   |   |   |   |   |
| N | X | X | X | X | X | X | X | X |

FIG. 9A

|   | 0 | 1 | 2 | 3 | 4 | 5 | 6 | 7 |
|---|---|---|---|---|---|---|---|---|
| Y | X | X | X |   |   |   |   |   |
| N |   |   |   | X | X | X | X | X |

FIG. 9B

|   | 0 | 1 | 2 | 3 | 4 | 5 | 6 | 7 |
|---|---|---|---|---|---|---|---|---|
| Y | X | X | X | X | X |   |   |   |
| N |   |   |   |   |   | X | X | X |

FIG. 9C

|   | 0 | 1 | 2 | 3 | 4 | 5 | 6 | 7 |
|---|---|---|---|---|---|---|---|---|
| Y |   | X | X | X | X |   |   |   |
| N | X |   |   |   |   | X | X | X |

FIG. 10

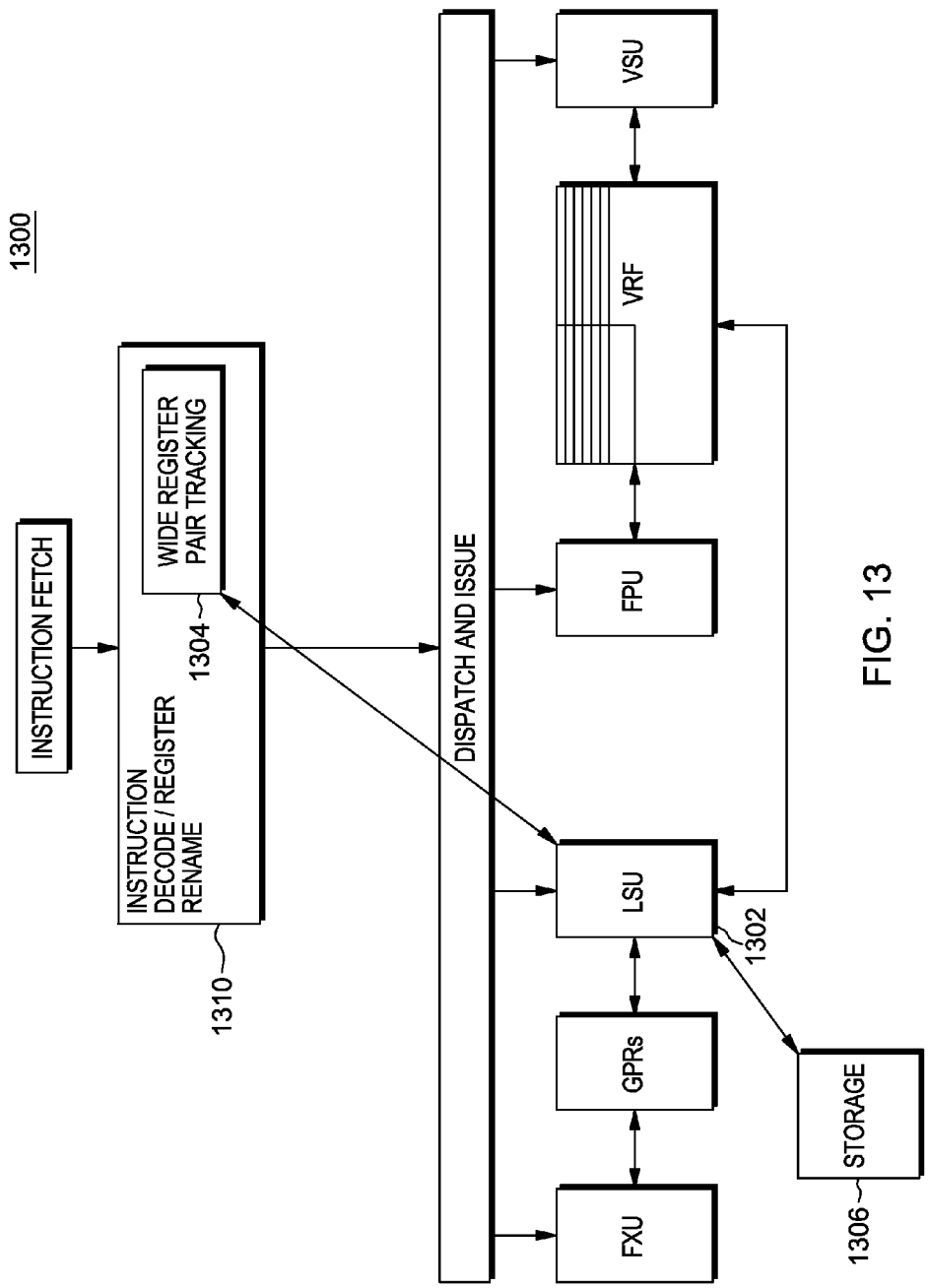

READING A REGISTER PAIR BY WRITING A WIDE REGISTER

CROSS-REFERENCE TO RELATED APPLICATIONS

This application is a continuation of co-pending U.S. patent application Ser. No. 14/068,725, filed Oct. 31, 2013, entitled "READING A REGISTER PAIR BY WRITING A WIDE REGISTER," which is hereby incorporated herein by reference in its entirety.

BACKGROUND

One or more aspects relate, in general, to processing within a computing environment, and in particular, to facilitating read operations.

Data precision within a computer architecture is often limited by the hardware. For example, hardware with 64-bit registers will typically be limited to using 64-bit data. In order to extend the precision of the data beyond 64-bits, special processing is required.

One technique of extending the precision of data is to use register pairing. Register pairing splits a number, such as a floating point number, across a pair of hardware registers. By using register pairing, the precision of a floating point number can be double what is possible using a single register.

When using register pairing, a single operation, such as an add operation, may require the reading of four registers and the writing of two registers. This requires double the number of read ports to a register file to obtain the input operands in one access to the registers, or multiple accesses using a single read port, which increases operation latency. On a subsequent read of this value, the two halves of the operand have to be read out and pieced back together, which further increases complexity and latency.

BRIEF SUMMARY

Shortcomings of the prior art are overcome and additional advantages are provided through the provision of a method of facilitating read operations. The method includes, for instance, initiating a read operation to obtain a wide input operand; determining, based on the initiating, whether the wide input operand is available in a wide register or in two narrow registers; based on determining the wide input operand is not available in the wide register, merging at least a portion of contents of the two narrow registers to obtain merged contents, writing the merged contents into the wide register, and continuing the read operation to obtain the wide input operand; and based on determining the wide input operand is available in the wide register, obtaining the wide input operand from the wide register.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3A depicts one embodiment of a register file;

FIG. 3B depicts register pairing in a 64-bit register;

FIG. 3C depicts one embodiment of storing a paired value in a 128-bit register;

FIG. 4A depicts one example of sample extended precision operations on a paired register;

FIG. 4B depicts one example of sample extended precision operations on an enhanced paired register;

FIGS. 9A-9C depict examples of a logical register pair tracking mechanism;

FIG. 10 depicts a further example of a logical register pair tracking mechanism;

FIG. 13 depicts one embodiment of a fetch and dispatch unit of a computer processor to implement instructions for loading and storing register pairing states;

DETAILED DESCRIPTION

In accordance with an aspect, a capability is provided for facilitating read operations by using single wide width registers to store input operands. In one embodiment, selected registers, such as floating point registers, are overlaid over larger (i.e., wider) registers, such as vector registers, providing an opportunity to maintain a wide-sized input operand in a single register (i.e., a single wide register). As used herein, a wide register is a single register that is able to store contents of multiple narrower (with respect to the wide register) registers in the single register. For instance, it is a 128-bit register that can store contents of a pair of 64-bit registers, and optionally, additional data. Although in the examples herein, wide registers are 128-bit registers, they can be of other sizes. Further, they may include the contents of more than a pair of registers or even less than a pair of registers, but more than one narrower register (e.g., contents of a 64-bit register plus partial contents of another 64-bit register and/or additional data). Additionally, the narrower or smaller registers may be other than 64-bit registers.

Figure 1:
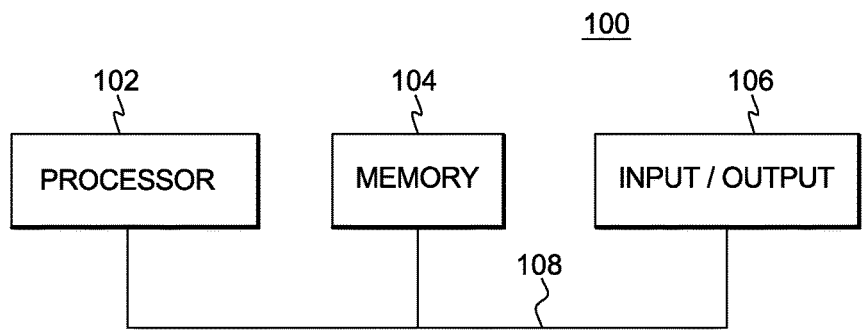
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one example, processor 102 is based on the z/Architecture offered by International Business Machines Corporation, and is part of a server, such as the System z server, which is also offered by International Business Machines Corporation and implements the z/Architecture. One embodiment of the z/Architecture is described in an IBM® publication entitled, "z/Architecture Principles of Operation," IBM® Publication No. SA22-7832-09, Tenth Edition, September, 2012, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation, Armonk, N.Y., USA. Other names used herein may be registered trademarks, trademarks, or product names of International Business Machines Corporation or other companies.

In a further embodiment, processor 102 is based on the Power Architecture offered by International Business Machines Corporation. One embodiment of the Power Architecture is described in "Power ISA™ Version 2.06 Revision B," International Business Machines Corporation, Jul. 23, 2010, which is hereby incorporated herein by reference in its entirety. POWER ARCHITECTURE® is a registered trademark of International Business Machines Corporation.

In yet a further embodiment, processor 102 is based on an Intel architecture offered by Intel Corporation. One embodiment of the Intel architecture is described in "Intel® 64 and IA-32 Architectures Developer's Manual: Vol. 2B, Instructions Set Reference, A-L," Order Number 253666-045US, January 2013, and "Intel® 64 and IA-32 Architectures Developer's Manual: Vol. 2B, Instructions Set Reference, M-Z," Order Number 253667-045US, January 2013, each of which is hereby incorporated herein by reference in its entirety. Intel® is a registered trademark of Intel Corporation, Santa Clara, Calif.

Figure 2A:
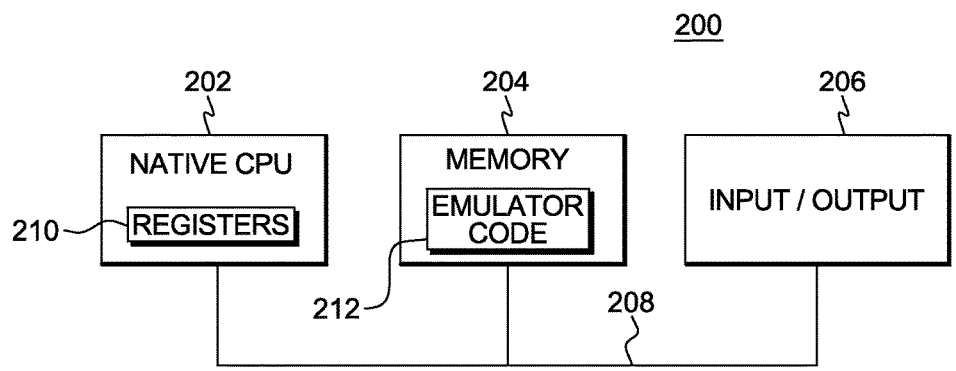
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a pSeries server or an xSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the z/Architecture, such as PowerPC processors, pSeries servers, xSeries servers, HP Superdome servers or others, to emulate the z/Architecture and to execute software and instructions developed based on the z/Architecture.

Figure 2B:
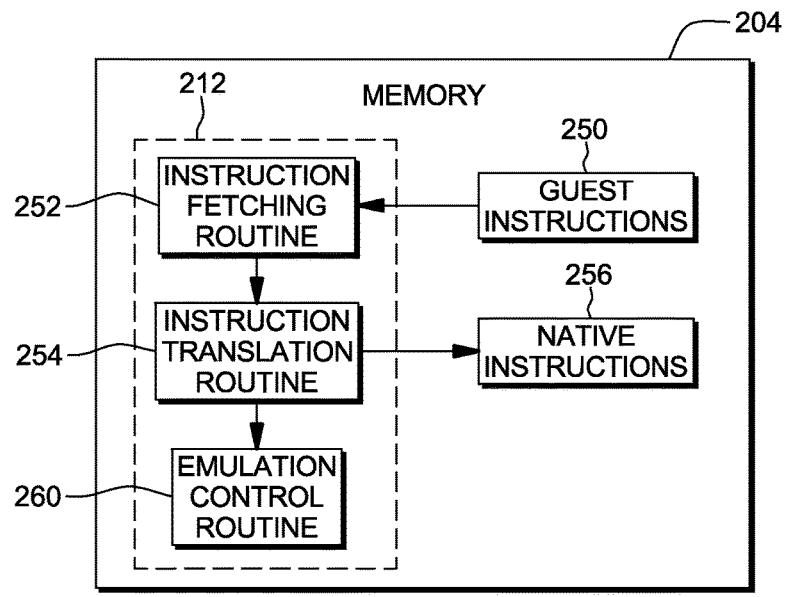
FIG. 2B depicts further details of the memory of FIG. 2A.

Further details relating to emulator code 212 are described with reference to FIG. 2B. Guest instructions 250 comprise software instructions (e.g., machine instructions) that were developed to be executed in an architecture other than that of native CPU 202. For example, guest instructions 250 may have been designed to execute on a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In accordance with one aspect, when registers, such as floating point registers, are overlaid over larger precision registers, such as vector registers, it is possible to keep an entire double sized value (i.e., a wide operand) in a single register, i.e., a single register having a wide width (e.g., 128 bits). Using wide registers reduces the need to access two registers in a register pair to retrieve an extended operand (e.g., a high precision floating point number) and provides in a single access a wide register. In one embodiment, a wide input operand is provided from merging contents of multiple registers that include the input operand, and storing the merged contents in a wide register. The wide register corresponds to named input registers (e.g., a pair of registers) that include the input operand prior to merging.

Extended precision instructions include one or more operands. In one embodiment, the operands are the same size (or width) as the vector register (e.g., 128-bits). In another embodiment, the operands may be less than the full width of the vector register. The operand values travel across a data path over a bus that is at least as wide as the operand. In an embodiment, execution units of a processor retrieve operands and execute the instructions using a dataflow over the bus that is at least as wide as the operands.

FIG. 3A depicts one embodiment of a register file 300. In an embodiment, register file 300 is a 128-bit register. As one example, register file 300 is a single instruction multiple data (SIMD) register file. Register file 300 includes 32 registers 302. Each of the 32 registers in register file 300 includes 128 bits 304. Each of the registers is addressable using one or more register fields in an instruction. The first 16 registers include 16 64-bit long floating point registers 306 that make up the first 64-bits of the entire 128-bit register. Floating point registers 306 provide compatibility for applications that execute 64-bit floating point instructions.

Although FIG. 3A depicts 64-bit floating point registers 306 within 128-bit registers, one of ordinary skill in the art understands that any sized register file may be used, with more or fewer registers, and wider or narrower registers. In addition, any sized floating point registers may be used.

FIG. 3B depicts one example of a register pairing in a 64-bit register. In one embodiment, a 128-bit decimal floating point operand is split into a high half 308 and a low half 310, with each half stored in a paired register. In one embodiment, the pair is stored in two operations. Further, in one embodiment, the register pairing is preconfigured. For example, all concurrent registers may be paired together (i.e., register 0 with register 1, register 2 with register 3, etc.). In another embodiment, odd and even registers may be paired together (i.e., register 0 with register 2, register 1 with register 3, etc.). Pairing refers to any two associated registers together storing a wide value, without regard to contiguous numbering of the registers of the register pair. For example, the high half 308 could be paired with a low half 310 according to an architectural relationship. For instance, in the z/Architecture from IBM, floating point registers are paired such that register 0 is paired with register 2, register 1 is paired with register 3, and so forth. When an operation is performed on floating point numbers that are paired, the instruction provides only one half of the register in the operand, because the pairing is preconfigured; the other half of the pairing is known, and therefore, does not have to be specified by the instruction.

FIG. 3C depicts one embodiment of a 128-bit register 312 and another 128-bit register 314. Each register is of a size that is capable of storing in the single register the value of a paired register, and therefore, is referred to herein as an enhanced paired register or a wide register. Register 312 includes the value of the paired registers of FIG. 3B, and register 314 includes the low half of the operand. In one embodiment, 128-bit register 312 and 128-bit register 314 are registers in register file 300 of FIG. 3A. In this example, a 128-bit decimal floating point operand is stored in its entirety in 128-bit register 312. Further, using a second operation, the low half of the 128-bit floating point operand is loaded into the first 64-bit section of 128-bit register 314.

FIG. 4A depicts one example of sample extended precision operations on a paired register. A first instruction 402 is executed. Each instruction is executed over a number of operations 406. The first instruction 402 includes two 128-bit operands that are stored in a paired register configuration (i.e., each 128-bit operand is stored in a register pair) and executes over a series of operations. In one embodiment, the first instruction 402 executes two register file fetches (RF) to select the two 128-bit operands from the register pairs (i.e., one half of each floating point number in each of two registers). Each register file fetch reads from two registers, and thus, two register file fetches are needed to read the four registers to obtain the two 128-bit operands. The register file fetches are followed by a merge operation (M). The merge operation merges the two halves of each of the 128-bit operands into single operands. The instruction's operation (e.g., addition) is carried out over three execution operations (EX), a condition code (CC) is set, and then the two halves of the result are written to the two register pairs over two write back operations (WB). The second instruction 404 is executed in the same manner. The result requires 16 operations over 12 cycles.

FIG. 4B depicts an example of sample dependent extended precision operations on an enhanced paired register (i.e., a wide register). The instructions are executed over a number of operations 408. A first instruction 410 is executed. The first instruction 410 includes two 128-bit operands that are stored in an enhanced paired register configuration and executes over a series of operations. In one embodiment, the first instruction 410 executes one RF to select the two 128-bit operands from the 128-bit register (i.e., each operand is selected directly from the 128-bit register). Again, one RF reads two registers, so both operands are retrieved from one RF. Note that no merge operation is needed because the 128-bit operands are fetched whole from the register. The instruction's operation (e.g., addition) is carried out over three EX operations and a CC is set. The result is a 128-bit operand and is stored in one operation into the first (high) register in its entirety in a WB operation. A second WB operation is used to copy the low order bits to the first 64-bits of the paired register to maintain architectural correctness. The second instruction 412 is executed in the same manner. The result requires 12 operations over 9 cycles saving 4 operations and 3 cycles. In addition, the two operations, which are dependent on one another, are able to execute sooner than would otherwise be the case.

Figure 5A:
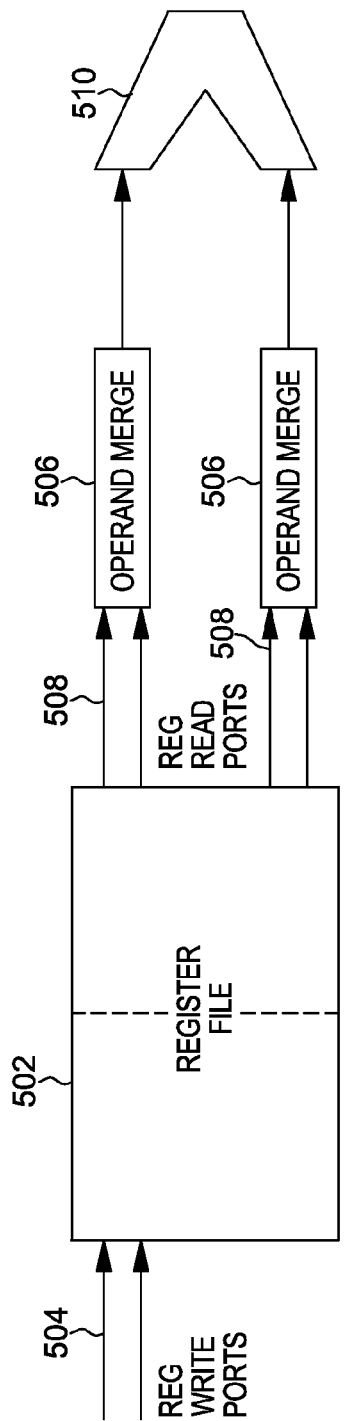
FIG. 5A depicts one embodiment of a schematic diagram for processing an extended precision operation.

FIG. 5A depicts one example of a schematic diagram for processing an extended precision operation. A register file 502 is updated by a pair of write ports 504. The requested operands are read from the register file 502 over a single operation using four read ports 508, or over two operations using two read ports 508. As stated above, the operands are stored in two 64-bit sections; therefore, the operands are merged using two merge operations 506. Once the operands are merged, the extended precision operation is performed by an arithmetic logic unit 510 (ALU), and the result is output from ALU 510.

Figure 5B:
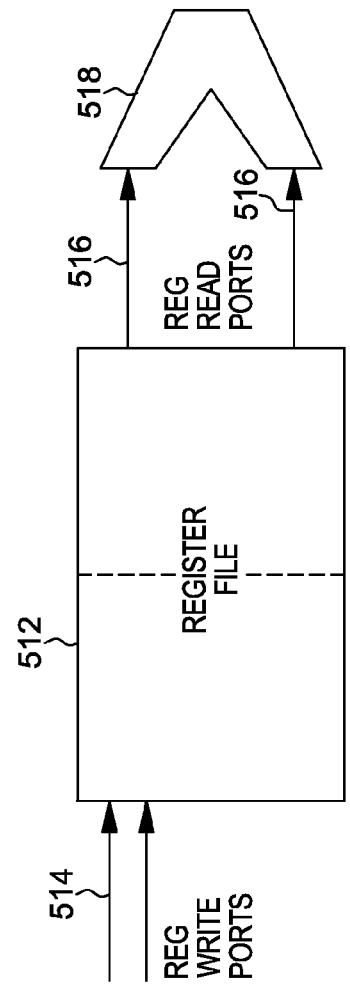
FIG. 5B depicts another embodiment of a schematic diagram for processing an extended precision operation.

FIG. 5B depicts another example of a schematic diagram for processing an extended precision operation in an alternate embodiment. Register file 512 is accessed by a pair of write ports 514. The requested operands are read from register file 512 over a single operation using only two read ports 516. In this embodiment, the operands have been previously written to register file 512 as 128-bit operands as described in more detail below, and therefore, only a single read to a 128-bit register is needed to retrieve each operand, thereby reducing the number of required read ports to two while still retrieving the two operands in a single cycle. Because the operands are retrieved as 128-bit operands directly from register file 512, no merge operations or circuitry is required to merge them and the extended precision operation is performed immediately by an ALU 518 on the 128-bit operands, and the result is output from ALU 518.

It will be understood that the elements of FIGS. 5A and 5B are provided for clarity and that more or fewer components may be used as would be understood by those of ordinary skill in the art. Furthermore, the operand lengths of 64-bit and 128-bit are used for purposes of clarity and it will be understood by those of ordinary skill in the art that any size operands, larger or smaller, may implement the various embodiments disclosed herein.

Figure 6:
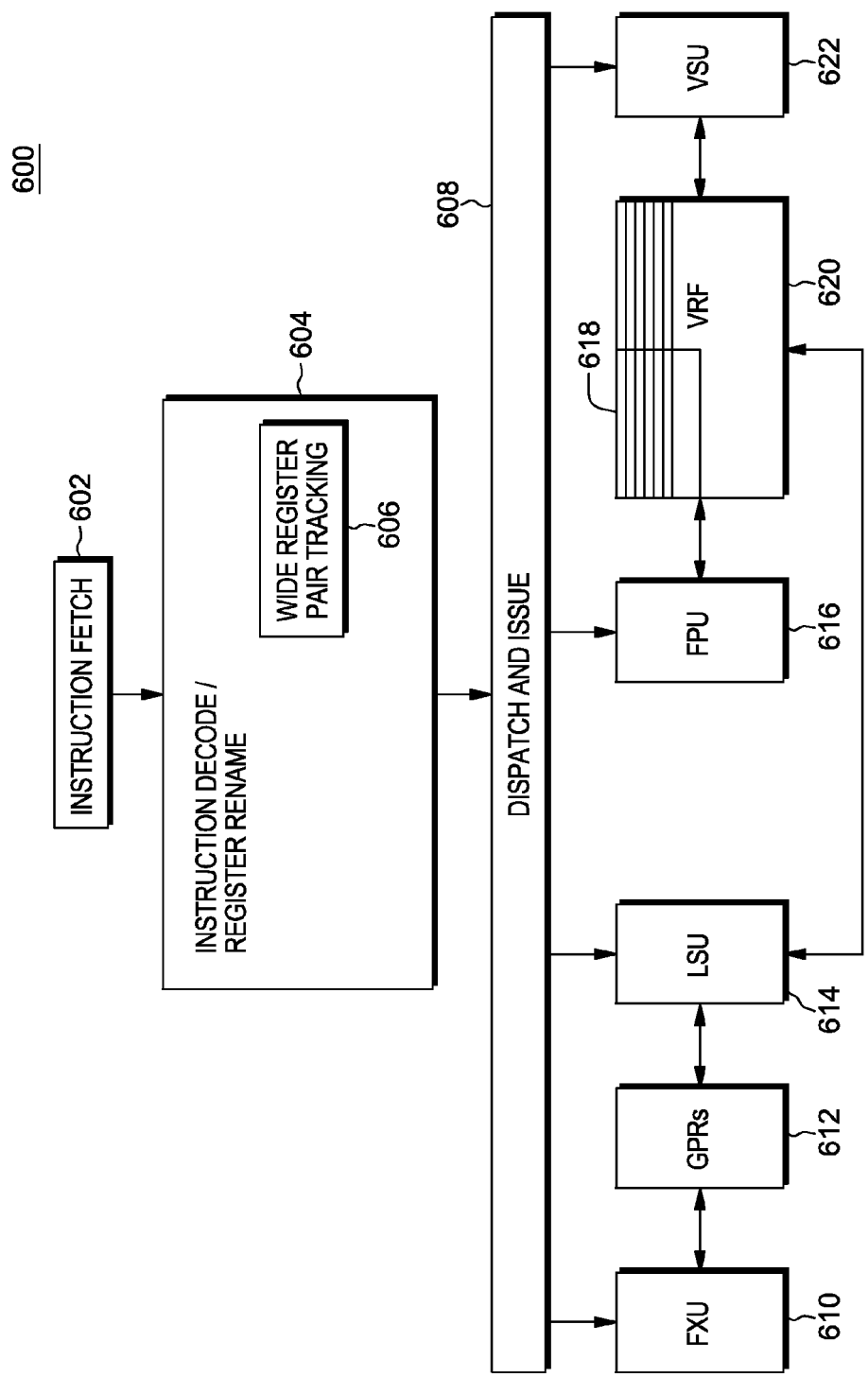
FIG. 6 depicts one example of a schematic diagram of a fetch and dispatch unit of a computer processor.

FIG. 6 depicts one embodiment of a schematic diagram of a fetch and dispatch unit of a computer processor. In an embodiment, a fetch and dispatch unit 600 includes an instruction fetch mechanism 602. Instruction fetch mechanism 602 sends instructions to an instruction decode/register rename module 604. Instruction decode/register rename module 604 decodes instructions, operands and register addresses and places them on a dispatch and issue bus 608. Dispatch and issue bus 608 dispatches requests to the appropriate execution units based on the instruction type. For example, dispatch and issue bus 608 dispatches requests to one or more of a fixed point execution unit (FXU) 610, a load store unit (LSU) 614, a floating point unit (FPU) 616 and a vector scalar unit (VSU) 622. FXU 610 is used for processing integer operations and accesses a set of general purpose registers (GPRs) 612. The LSU performs reads and writes to the GPRs and a vector register file (VRF) 620. The VRF includes 128-bit vector registers (VRs). In one embodiment, VRF 620 is the register file 300 of FIG. 3, and includes a 64-bit floating point register 618 within the larger 128-bit VRF 620. The FPU accesses 64-bit floating point numbers from floating point register 618 within VRF 620. In an embodiment, FPU 616 is configured to perform both 64-bit operations and 128-bit extended operations as described above with regard to FIGS. 5A and 5B. VSU 622 performs 128-bit operations on 128-bit operands stored in VRF 620, and in one embodiment, may perform the 128-bit extended operations described above with regard to FIG. 5B.

Fetch and dispatch unit 600 further includes, in one embodiment, a wide register pair tracking module 606 used to track paired register values that are stored in wide registers. Wide register pair tracking module 606 is, for instance, a pairing vector and includes a number of bits that is half the number of total pairable registers. For example, in an embodiment that includes 16 registers that may be paired, the wide register pair tracking module 606 includes eight bits. A bit of wide register pair tracking module 606 is set to indicate if a value of a paired register has been stored in a wide register corresponding to the paired register, as described in further detail below.

Figure 7A:
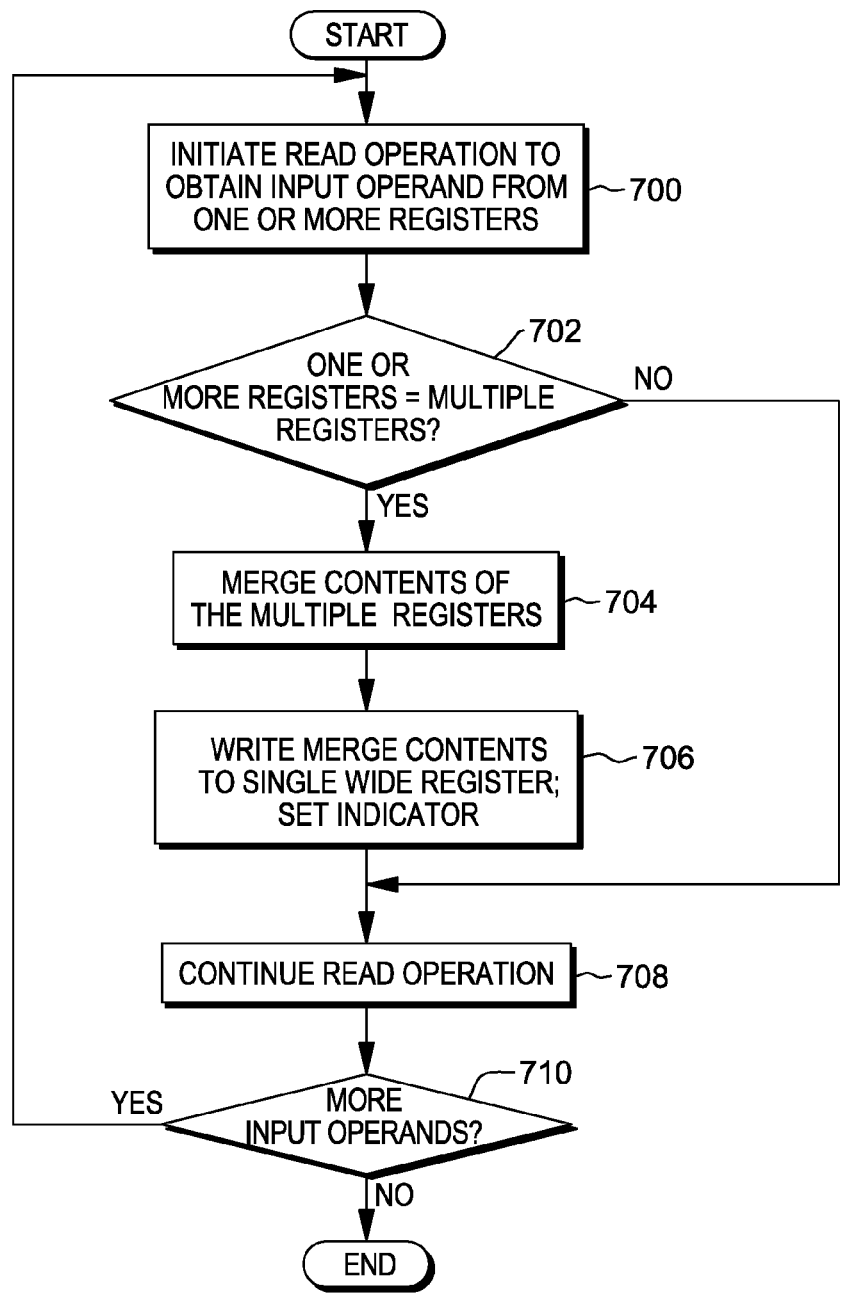
FIG. 7A depicts one embodiment of the logic to perform a read operation using a wide register.

In one embodiment, fetch and dispatch unit 600 is used to read input operands from one or more registers. One embodiment of the logic to read input operands from one or more registers is described with reference to FIG. 7A. Referring to FIG. 7A, a read operation is initiated, via, for instance, an instruction, to obtain an input operand (e.g., a wide input operand) from one or more registers, STEP 700. This operation is assumed herein to be an extended precision operation. A determination is made as to whether the one or more registers equals multiple registers, such as a set of paired registers (e.g., two narrow registers), INQUIRY 702. For instance, a pairing indicator (e.g., a bit) in wide register pair tracking module 606 is checked to see if it is set indicating that a single wide register includes the input operand. If a single wide register includes the input operand, then the read operation continues, STEP 708, and the operand is read from the single wide register.

However, if the one or more registers equal multiple registers meaning that the input operand has not been stored to a single wide register, but instead, is available in, for instance, two narrow registers, then contents of the multiple registers are merged, STEP 704. The merged contents are written to a single wide register and the pairing indicator is set to indicate such, STEP 706. The read operation then continues, STEP 708. In one example, the continuation of the read operation includes reading the input operand from the merged contents without accessing the single wide register. In a further embodiment, the single wide register is accessed in order to obtain the input operand to continue the read operation.

Thereafter, a determination is made as to whether there are more input operands to be obtained, INQUIRY 710. For instance, if the instruction does not specify additional operands, then processing completes. Otherwise, processing continues with STEP 700.

Figure 7B:
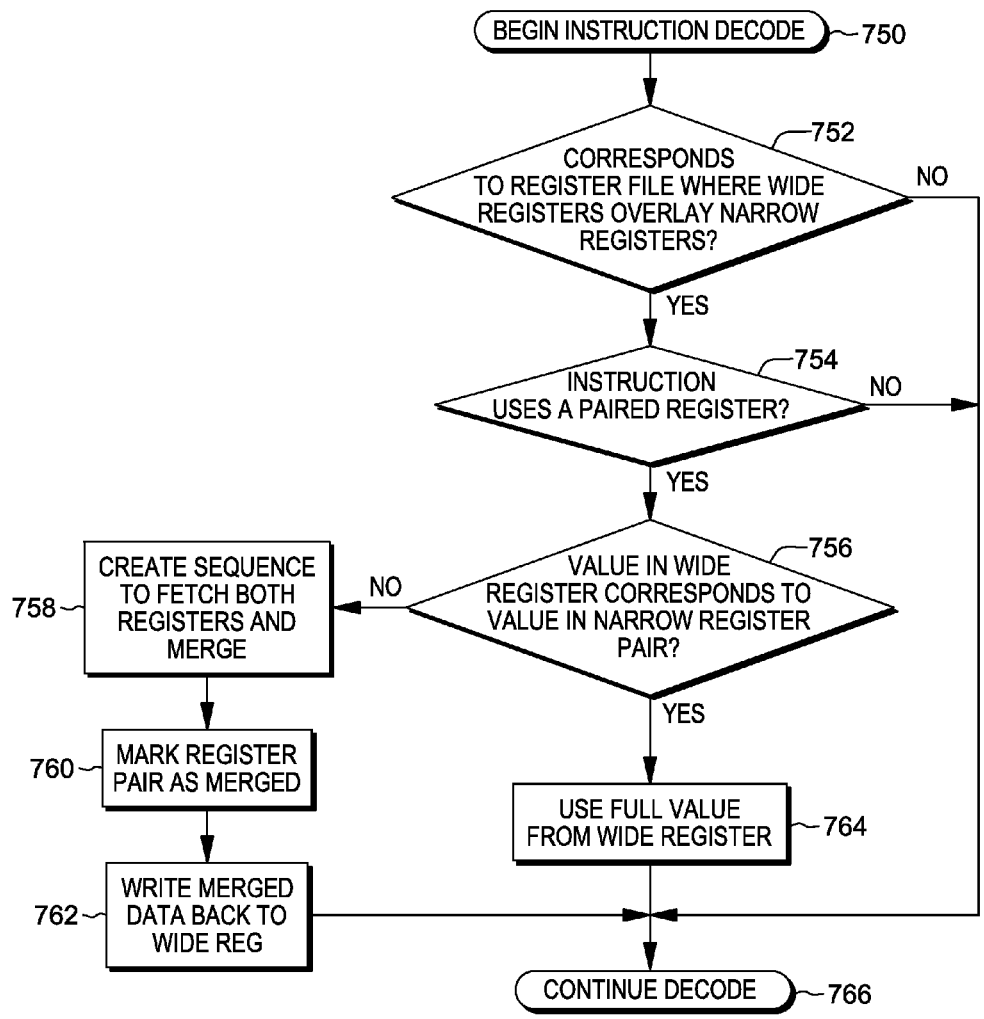
FIG. 7B depicts further details of one embodiment of the logic to perform a read operation using a wide register.

FIG. 7B depicts further details of one embodiment of a process flow for reading operands from one or more registers. In an embodiment, the process flow of FIG. 7B is executed by fetch and dispatch unit 600 of FIG. 6. The decoding of an instruction is started by, for example, the instruction decode/register rename module 604 of FIG. 6, STEP 750. A determination is made as to whether the operands of the instruction correspond to a register file where wide registers overlay narrow registers, such as the register file 300 of FIG. 3, INQUIRY 752. If wide registers overlay the narrow registers, then it is determined if the instruction uses pairing, INQUIRY 754. An instruction uses pairing if, for example, it performs an extended precision operation using one or more 64-bit paired registers in an FPR. If the instruction uses one or more paired registers, then a determination is made as to whether the value in the wide register corresponds to the value across the two narrow registers, INQUIRY 756. This may be determined, for instance, by inspecting a value in wide register pair tracking module 606 corresponding with the register pair for the one or more operands in the instruction. If the value is set, then a wide register stores the input operand of the paired registers. In an alternate embodiment, this may be determined by comparing the values of the two paired registers with the value of the single wide register (i.e., by comparing the value in the second half of the high register's 128-bit value with the value of the other half of the register pair.) If it is determined that the wide register includes the full value of the paired register, then processing continues at STEP 764.

At STEP 764, the entire 128-bit operand is selected from the wide register, as described above with regard to FIG. 5B, and processing continues with the decode operation, STEP 766. Returning to INQUIRY 756, if the wide register does not include the values that correspond to the register pairing (i.e., the second half of the wide register does not include the other half of the register pair), then processing continues with creating a sequence to fetch both halves of the register pair and then merge them, STEP 758, as described herein. Subsequent to creating the sequence, the register pair is marked as merged, STEP 760. For instance, the indicator (e.g., bit) in the wide register pair tracking module corresponding to the pair of registers is set to one. Further, the merged data is written to the wide register for use by the instruction and/or one or more subsequent instructions, STEP 762. Thereafter, processing continues with instruction decode, STEP 766.

Returning to INQUIRY 754, if the instruction does not use a paired register, then processing continues with instruction decode, STEP 766. Similarly, returning to INQUIRY 752, if it is determined that the operands of the instruction do not correspond to a register file where wide registers overlay narrow registers, processing continues with instruction decode, STEP 766.

Figure 8:
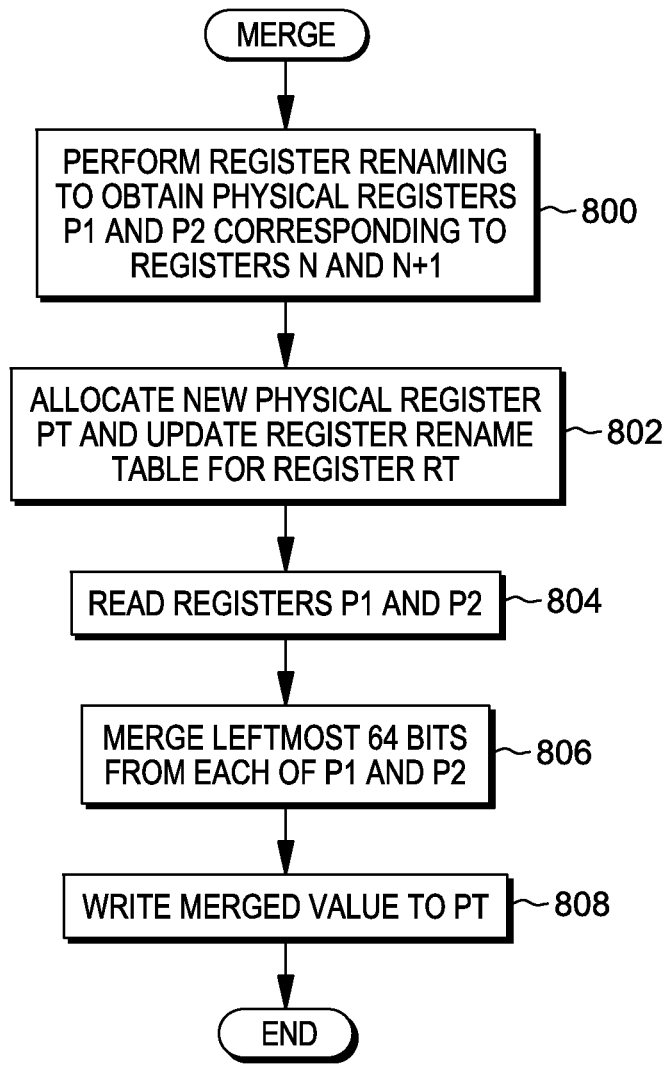
FIG. 8 depicts one example of logic to merge contents of multiple registers.

One embodiment of further details of the merge operation is described with reference to FIG. 8. This logic is performed by, for instance, the fetch and dispatch unit of the processor, and corresponds to, for instance, STEPs 704 and 706 of FIG. 7A, and STEPs 758 and 762 of FIG. 7B. In one embodiment, register renaming is performed to obtain addresses of the physical registers P1 and P2 corresponding to logical registers N and N+1, STEP 800. That is, in one embodiment, the input registers specified in the instruction are considered logical registers, and therefore, to perform the merging, the physical registers corresponding to the logical registers are obtained.

A new physical register PT is allocated for the result (e.g., the wide 128-bit result), and a register rename table is updated to associate the physical register PT with a logical register RT, STEP 802. Additionally, registers P1 and P2 are read, STEP 804, and at least a portion of the contents of registers P1 and P2, such as, for instance, the leftmost 64 bits from each of registers P1 and P2 are merged (e.g., concatenated), STEP 806. The merged value is then written to physical register PT, STEP 808.

FIGS. 9A-9C depict an example of a logical wide register pair tracking mechanism. In an embodiment, the logical wide register pair tracking mechanism of FIGS. 9A-9C is the wide register pair tracking module 606 of FIG. 6. The logical wide register pair tracking module 902 of FIG. 9A depicts wide register pair tracking when the logical wide register pair tracking module 902 is initialized or reset. In an embodiment, none of the register pairs have been written across a single 128-bit register entry. It will be understood by those of ordinary skill in the art that although the logical wide register pair tracking module 902 indicates that no register pairs have been written across the 128-bit register entry this does not indicate that the register pairs are not being paired. In an embodiment, one or all of the registers may be paired with 64-bit halves in each of the paired registers without the logical wide register pair tracking module 902 indicating that the registers are paired.

In one example, tracking module 902 has a plurality of pairing indicators 903 (e.g., bits), and each indicator, in this example, corresponds to a register pair. For instance, the first indicator (i.e., bit 0) corresponds to register pair 0,1; the second indicator (i.e., bit 1) corresponds to register pair 2, 3; etc.

The logical wide register pair tracking module 904 of FIG. 9B depicts how the logical wide register pair tracking module 902 of FIG. 9A will be set after performing the operation R0=R2+R4, where R0 is a register pair between R0 and R1, R2 is a register pair between R2 and R3, and R4 is a register pair between R4 and R5. In an embodiment, the values stored in the register pair R2 and R3 are read from the registers and merged and added to the merged pairs of the register pair R4 and R5 as described above with regard to FIG. 5A. The results of the addition operation are stored in the register pair R0 and R1, however, the 64-bit value stored in R1 is also stored in the second 64-bit section of R0. Because R0 has been written to as a result of an extended precision operation, the first pairing indicator of the logical wide register pair tracking module 904 is updated to indicate that the R0 register pair (i.e., pair 0) is a valid register pair, and that the 128-bit value in R0 includes the entire extended precision value of the R0 register pair. In an embodiment, the first 64-bit section of register R1 also includes the last 64-bits of the result of the operation, and therefore, equals the last 64-bit section of register R0.

The logical wide register pair tracking module 906 of FIG. 9C depicts how the logical wide register pair tracking module 904 of FIG. 9B will be set after performing the operation R6=R0+R8, where R0 is the register pair that was previously set with the result of an extended precision operation, R8 is a register pair between R8 and R9, and R6 is a register pair between R6 and R7. The operation is performed as described above with the output being set to the register pair for R6. The fourth pairing indicator in the logical wide register pair tracking module 906 (i.e., bit three) is set to indicate that the R6 register pair (i.e., pair 3) is a valid wide register pair, and that the 128-bit value in R6 includes the entire extended precision value of the R6 register pair. In an embodiment, the first 64-bit section of the register R6 also includes the last 64-bits of the result of the operation, and therefore, equals the last 64-bit section of register R7.

FIG. 10 depicts one example of how the logical wide register pair tracking module 906 of FIG. 9C will be set after performing the short addition operation (e.g., ADD64) R1=R8+R6. Each of R1, R8 and R6 is used as a standard 64-bit short register. Therefore, after the arithmetic operation is complete the 64-bit result of adding the register R8 and the register R6 will be stored in register R1. Because this 64-bit value is written over the lower half of the R0 register pair, the R0 register pair indicator (i.e., bit zero) is reset to indicate that the register pair R0 is no longer a valid wide register pair. In an embodiment, the wide register pair indicator in the logical wide register pair tracking module 1002 is reset if the result of the operation was written into the high register (i.e., R0) as well. The logical wide register pair tracking module 1002 therefore only indicates known valid wide register pairs (i.e., wide registers that include a value from paired registers).

In an embodiment, the logical wide register pair tracking mechanisms of FIGS. 9A-9C and 10 are implemented as a series of bits that are used to indicate if the logical wide pairing exists for each of the register pairs supported by the system.

Figure 11:
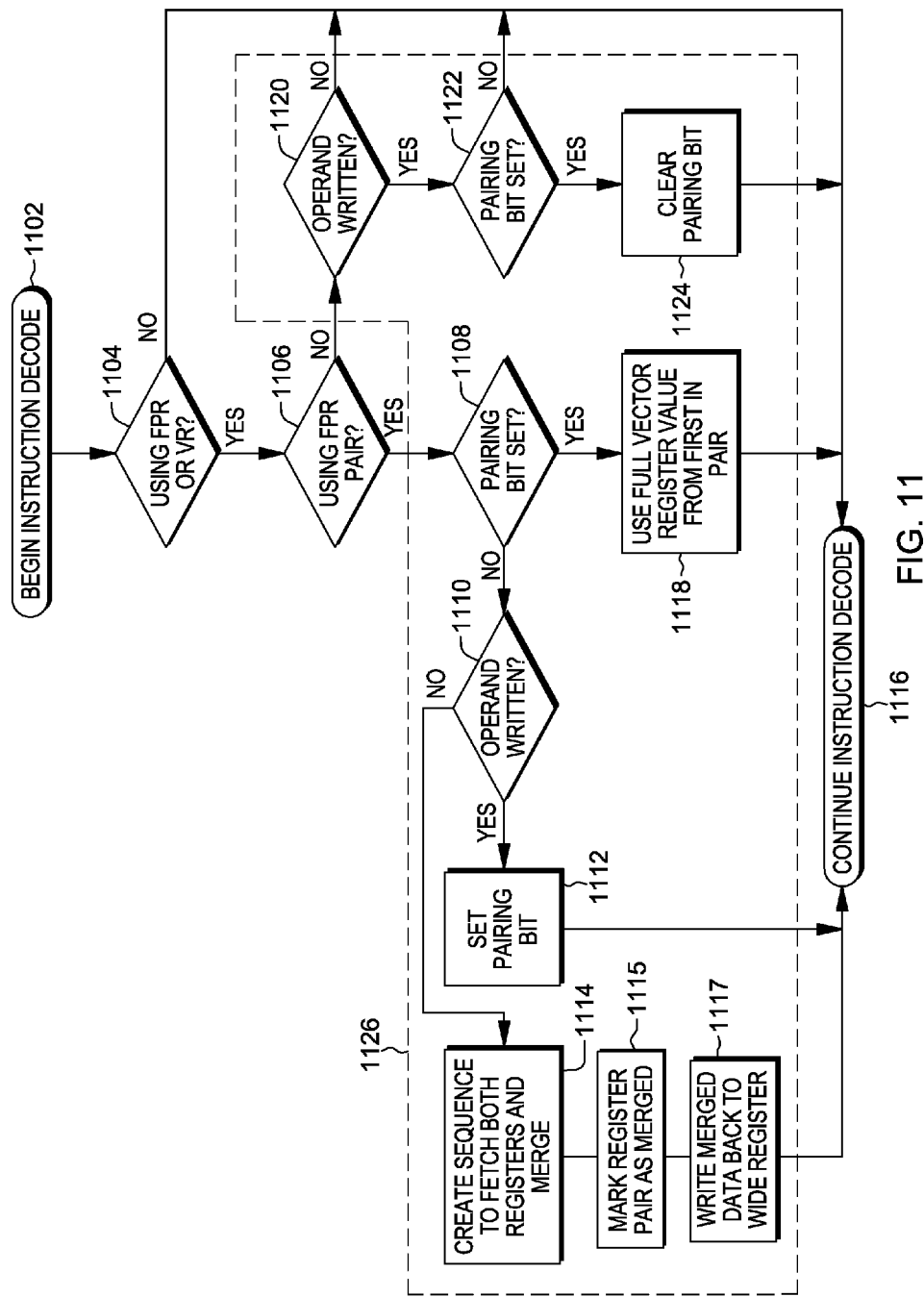
FIG. 11 depicts one embodiment of a process flow for maintaining register pairing status.

One embodiment of a process flow for maintaining wide register pairing status is described with reference to FIG. 11, which is executed, for instance, by fetch and dispatch unit 600 of FIG. 6. Referring to FIG. 11, the decoding of an instruction is started by, for example, the instruction decode/register rename module 604 of FIG. 6, STEP 1102. A determination is made as to whether the instruction includes operands that are in one of the FPRs or the VRs, INQUIRY 1104. If the instruction includes operands that are in one of the FPRs or the VRs, then a further determination is made as to whether the instruction uses an FPR pair, INQUIRY 1106. As stated above, certain extended precision floating point instructions use register pairs to store extended precision floating point numbers across two 64-bit registers that are paired together. If register pairs are used by the instruction, then processing of the steps within the operand processing block 1126 continues for each operand in the instruction starting at STEP 1108.

At STEP 1108, for an operand of the instruction, a determination is made as to whether the pairing bit in the wide register pair tracking module corresponding to the register pair of the operand is set. If the operand does not have a pairing bit set, then processing continues with a determination as to whether the operand is a write operand (i.e., the operand is where the result of the operation will be stored), INQUIRY 1110. If the operand is a write operand that will be written, then processing continues with setting a pairing bit for the operand's destination register pair (i.e., the register pair that will receive the result of the instruction's operation), STEP 1112. In one embodiment, once the instruction has completed successfully, the value of the result operation will be written across the high register's full 128 bits, and the low order bits will also be written to the low register of the register pair. In an embodiment, the low register may be the register that is numerically higher or lower than that of the high register in the register pair. Once the pairing bit is set, instruction decode continues, STEP 1116.

Returning to INQUIRY 1110, if the operand is not a write operand, but instead, an input operand, then a sequence is created to fetch the two halves of the operand and merge them as described above, STEP 1114. Further, the register pair is marked as merged (e.g., the pairing bit corresponding to the operand is set), STEP 1115, and the merged contents are written to the wide register corresponding to the register pair, STEP 1117. Subsequent to creating the sequence, processing continues with instruction decode, STEP 1116.

Returning to INQUIRY 1108, if the pairing bit is set for the operand, the operand value is selected in one operation from the full VR of the high register of the register pair as described above, STEP 1118, and processing continues to instruction decode, STEP 1116.

Returning to INQUIRY 1106, if the instruction is not using register pairing (i.e., the instruction is not an extended precision floating point operation), then processing continues with determining if the operand is a write operand, INQUIRY 1120. If the operand is a write operand that will be written, then processing continues with determining if a pairing bit was previously set for the register pair associated with the operand as described above, INQUIRY 1122. If the pairing bit has been set, then the pairing bit is cleared for the register pair containing the write operand's single target register, STEP 1124. The register bit is cleared because the target register that is either the low or high register of the register pair has received a non-extended floating point value, and therefore, the status of the register pair is no longer known to be valid. Subsequent to clearing the pairing bit, STEP 1124, instruction decode continues, STEP 1116.

Returning to INQUIRY 1122, if the pairing bit was not previously set for the target register pair, then instruction decode continues, STEP 1116.

Returning to INQUIRY 1120, if the operand is not a write operand, or no value was written to the target register associated with the operand, then instruction decode continues, STEP 1116.

Returning to block 1104, if the instruction does not use values from the FPR or VR, then instruction decode continues, STEP 1116.

As indicated above, in one embodiment, the processing associated with operand processing block 1126 is repeated for each operand of the instruction.

Figure 12A:
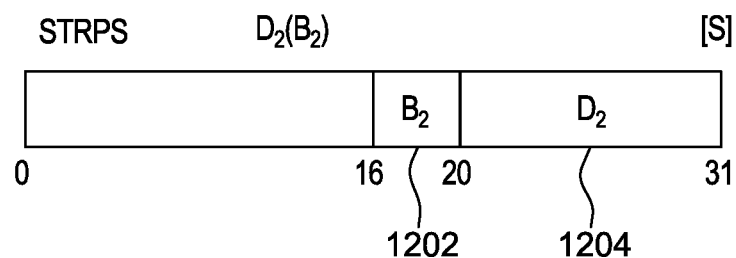
FIG. 12A depicts one example of an instruction for storing register pair state.

FIG. 12A depicts one embodiment of an instruction for storing register pair state. In one embodiment, a store vector pairing state instruction 1200 (STRPS) stores the pairing state to a memory address specified by adding an offset value 1204 to an address specified in a general purpose register indicated by $B_2$ 1202.

Figure 12B:
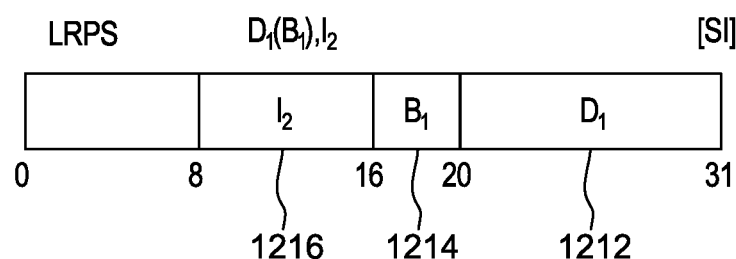
FIG. 12B depicts one example of an instruction for loading register pair state.

FIG. 12B depicts one embodiment of an instruction for loading wide register pair state. In one embodiment, a load vector pairing state instruction (LRPS) 1210 loads the wide register pairing state from a memory address specified by adding an offset value 1212 to an address specified in a general purpose register indicated by $B_1$ 1214. LRPS 1210 loads the wide register pairing state from memory at the specified memory address into a temporary area. The LRPS specifies a mask address 1216 for a mask that is stored in either a register, an immediate field, or a memory location. In an embodiment, each bit of the mask represents whether the wide register pairing state being loaded from memory is valid.

Instructions for loading and storing wide register pairing states are implemented in one example by a fetch and dispatch unit of a computer processor, an example of which is described with reference to FIG. 13. Referring to FIG. 13, in one embodiment, a fetch and dispatch unit 1300 is the fetch and dispatch unit 600 of FIG. 6. In an embodiment, when STRPS instruction 1200 is executed, load store unit (LSU) 1302 fetches the pairing vector from a wide register pair tracking module 1304 and stores it in a storage location 1306. In an embodiment, storage location 1306 is an area in main memory. In an additional embodiment, storage location 1306 is on a storage disk, such as a hard drive or a storage area network (SAN), as examples.

In one embodiment, when LRPS instruction 1210 is executed, load store unit 1302 (LSU) fetches the pairing vector from storage location 1306, loads it into a temporary location, such as an internal register, and applies the mask as described above. The resultant pairing vector is loaded from the temporary location into wide register pair tracking module 1304.

In a speculative out-of-order microprocessor, the decoding of instructions which access the vector register file is to be stalled until the wide register pairing state is restored from the storage location. In one embodiment, for each set of paired registers, an instruction decode/register rename module 1310 maintains three states. Thus, for instance, wide register pair tracking module 1304 includes at least two indicators (e.g., bits) to represent the three states. The three states include, for instance, that the register pair is stored across the wide register, that the register pair is not stored across the wide register, or that it is unknown if the register pair is stored across the wide register. When the state is known, instruction decode/register rename module 1310 will either retrieve the data from the wide register (if it is there), or it will insert an operation to fetch both of the registers and merge the data (if the data is not stored in the wide register).

In an embodiment, when the wide register pairing state of the pair of registers is unknown, instruction decode/register rename module 1310 speculatively executes the operation with the full wide vector. It then inserts a check operation to ensure that the data for the register pair is contained in the wide register. If the check passes, then the state of the pair is set to known paired and stored in the wide register and execution continues. If the check fails, execution is rewound to the point before the operation that used the register pair, and the state of the pair is set to not paired. Instruction decode/register rename module 1310 then generates a merge sequence to read the pair of registers.

Figure 14:
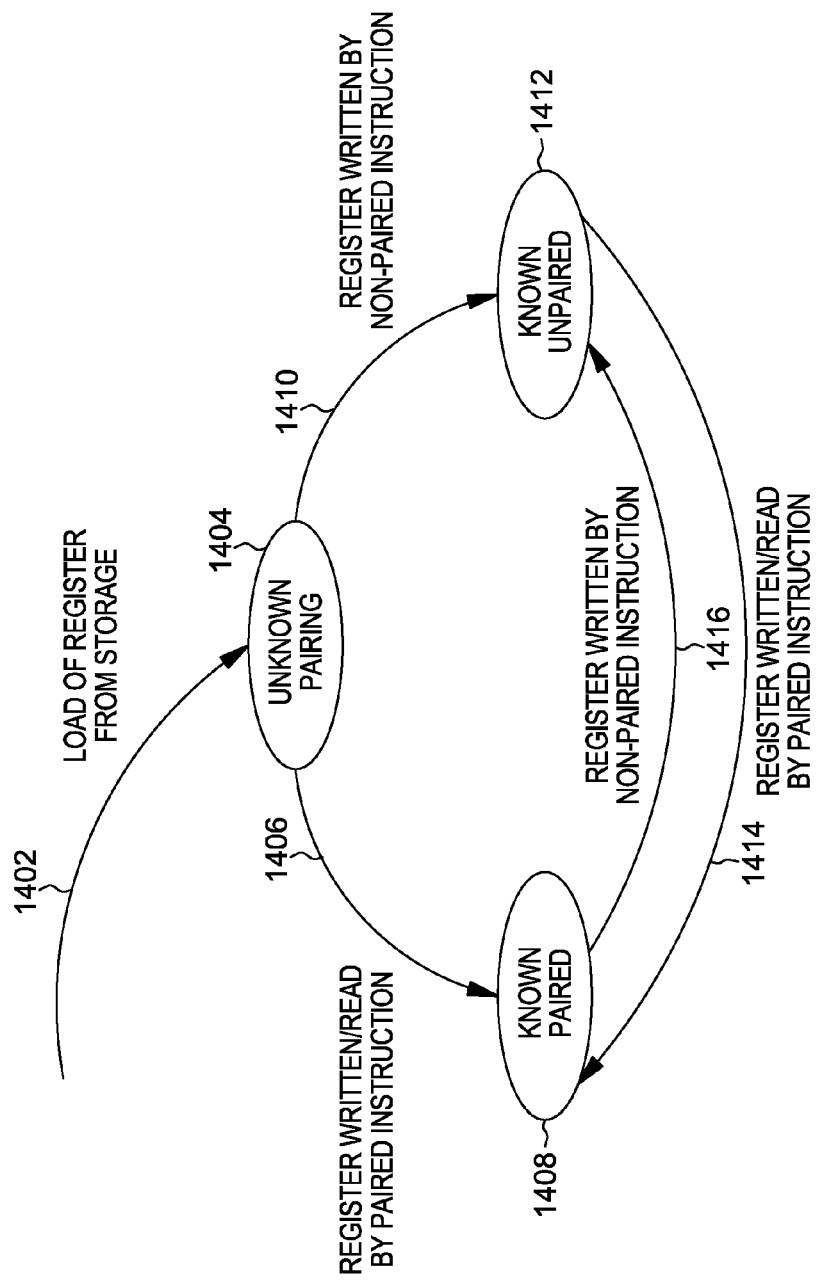
FIG. 14 depicts one example of a state diagram for determining the state of a register pair.

FIG. 14 depicts one example of a state diagram for determining the wide register pairing state of a register pair. In one embodiment, the registers are loaded from storage 1402 after, for example, a context switch or a function call or normal execution. When the registers are first loaded from storage, their wide register pairing state is unknown 1404. From unknown state 1404, if a register is written or read using an extended precision instruction (i.e., an instruction known to pair the registers), the state transitions 1406 to a known paired state 1408. If, however, either of the registers of a register pair is written by a non-extended precision instruction, then a non-paired transition 1410 occurs and the state of the register pairing becomes a known unpaired state 1412.

From the known unpaired state 1412, a known paired transition 1414 occurs when the register pair is written to or read by an extended precision instruction, and the state transitions to the known paired state 1408. From the known paired state 1408, a known unpaired state transition 1416 occurs if either of the registers of a register pair is written by a non-extended precision instruction, and the state of the register pairs becomes the known unpaired state 1412.

Figure 15:
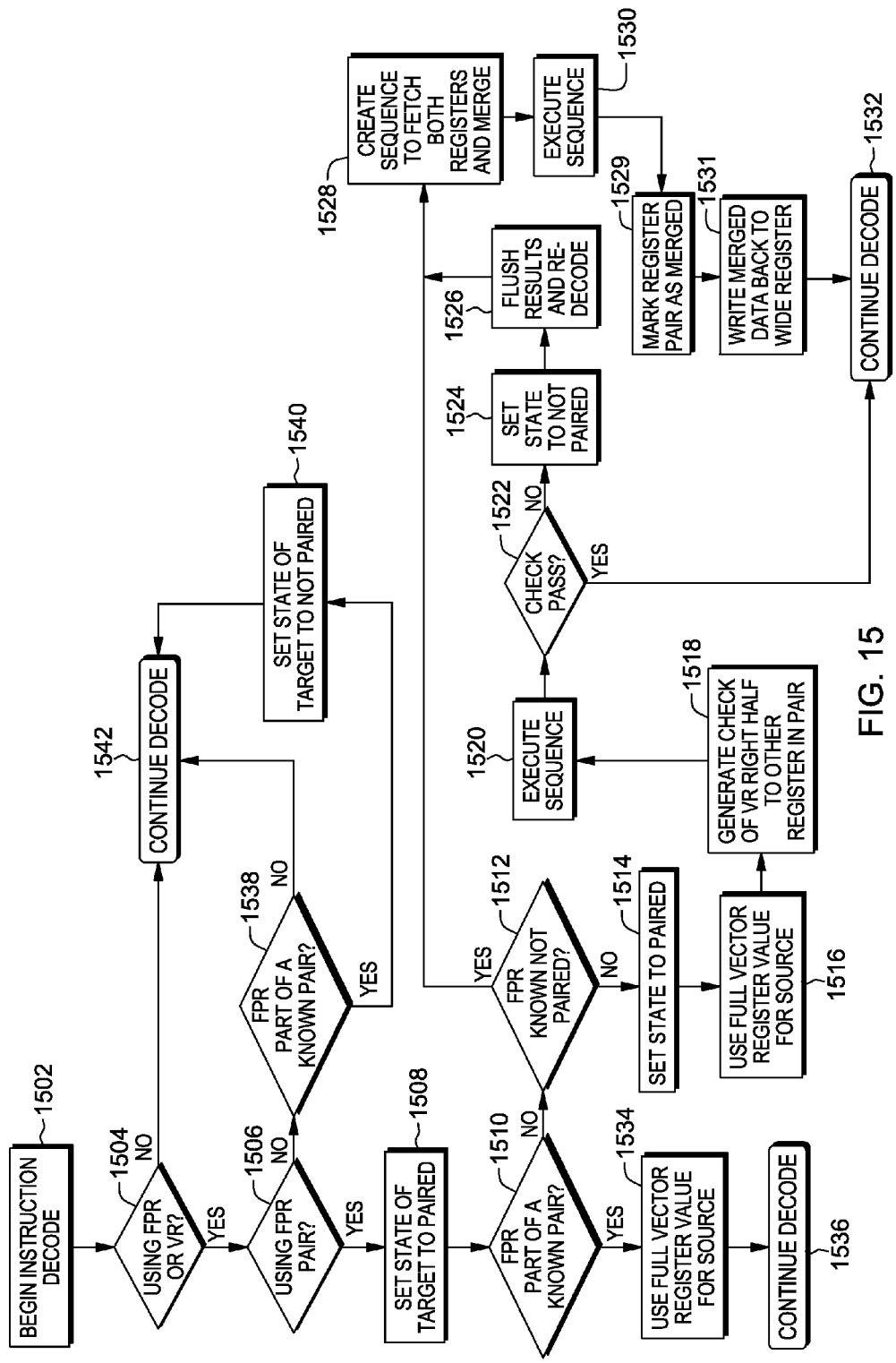
FIG. 15 depicts one embodiment of a process flow for managing an unknown pairing state.

FIG. 15 depicts one embodiment of a process flow for managing an unknown pairing state in speculative processing. In one embodiment, the process flow of FIG. 15 is executed by fetch and dispatch unit 600 of FIG. 6. Initially, the instruction decode process begins, STEP 1502. A determination is made as to whether the instruction includes operands that are in one of the FPRs or the VRs, INQUIRY 1504. If the instruction includes operands that are in one of the FPRs or the VRs, then it is determined if the instruction uses an FPR pair (i.e., is the instruction an extended precision instruction), INQUIRY 1506. As stated above, certain extended precision floating point instructions use register pairs to store extended precision floating point numbers across two 64-bit registers that are paired together. If register pairing is used by the instruction, then the state of the register pairing for the target register of the instruction (i.e., where the result of the instruction is stored) is set to paired, STEP 1508. In an embodiment, the state is set in wide register pair tracking module 606. Further, it is determined if the FPR of the input operands (i.e., the operands that will be used to generate the result of the extended precision operation) are part of a known pair, INQUIRY 1510. A known pair is any register pair where the status is known to be paired. If the pairing status of the registers is not known, then processing continues at INQUIRY 1512.

At INQUIRY 1512, it is determined if the register pair is known to be not paired (i.e., not stored in a wide register). If the register pair is not known to be not paired (i.e., the status of the register pairing is unknown), then the state of the register pair is set to paired as described above, STEP 1514. Further, the full VR value is used for the source operand (i.e., the full 128-bit value is selected from the high register of the register pair without performing a merge), STEP 1516. A check is generated to ensure that the low order bits of the selected register match the low register part of the extended precision floating point number, STEP 1518. The check is performed, for instance, by executing the generated check sequence of instructions, STEP 1520. It is determined if the check has passed (i.e., the bits match), INQUIRY 1522. If the check did not pass, the register pair is set as not paired in the wide register pair tracking module, STEP 1524. Further, the results of the instruction decode are flushed, and the instruction is re-decoded from the beginning, STEP 1526. Further, a sequence is created to fetch the register values from both of the register pairs, and to merge the values to create an extended precision floating point number, STEP 1528. The sequence to fetch and merge the registers is performed, STEP 1530, the register pair is marked as merged (e.g., the pairing bit is set), STEP 1529, and the merged contents are written to the wide register, STEP 1531. Decode of the instruction continues, STEP 1532.

Returning to INQUIRY 1522, if the check of the low order bits of the VR against the bits stored in the low register of the register pair succeeds, then decode of the instruction continues, STEP 1532.

Returning to INQUIRY 1512, if the register pair is known to be not paired, then a sequence is created to fetch the register values from both of the register pairs, and to merge the values to create an extended precision floating point number, STEP 1528. The sequence to fetch and merge the registers is performed, STEP 1530, the register pair is marked as merged, STEP 1529, and the merged contents are written to the wide register, STEP 1531. Decode of the instruction continues, STEP 1532.

Returning to INQUIRY 1510, if the pairing status of the registers is known to be paired, then the full 128-bit VR value is used without requiring a merge, STEP 1534, and decode of the instruction continues, STEP 1536.

Returning to INQUIRY 1506, if the instruction does not uses FPR pairing (i.e., the instruction is not an extended precision floating point instruction), then it is determined if the target FPR is part of a known register pair (i.e., it was previously known to be part of a wide register pair), INQUIRY 1538. If the FPR was part of a known register pair, then the state of the register pairing for the target register of the instruction is set to not paired, STEP 1540, and decode of the instruction continues, STEP 1542.

Returning to INQUIRY 1538, if the target FPR is not part of a known pair, then decode of the instruction continues, STEP 1542. Returning to INQUIRY 1504, if the instruction does not use an FPR or a VR, then decode of the instruction continues, STEP 1542.

Described in detail herein is a capability in which a read of an extended operand (e.g., 128 bits) writes a paired register value across a wide register. This value can then be used in the current read operation, as well as subsequent read operations. In particular, a capability is provided for merging a register pair into a wide register, and storing that merged value, on a read. By merging register pairs on a read it is possible to further reduce the number of multiple register reads per operand. In one embodiment, when an instruction decode unit detects that a paired register is being used, the decode unit checks with a tracking mechanism to see if the register pair has been written to a wide register. If it has not been, then the decode unit generates a sequence of internal operations which first merges the two registers, and then performs the operation on the wide register. If there are multiple paired registers for the operation, the process is repeated for each operand. This is advantageous because it does the pairing on reads as well as writes. Some values may never be written to, or may be read multiple times before being written.

Accessing data distributed over two registers is disadvantageous, due to increased latency; requires additional register read ports; and may require additional issue slots. Thus, it is desirable to exploit using a single access to the data resident in a wide register to improve performance, and when the program result is not impacted. Therefore, in one aspect, a way to convert two accesses to two portions of two registers to a single access to a wide register on subsequence reads is provided. In one embodiment, a tracking facility is used to identify when such conversion is to be performed.

In one aspect, in a register file, when a pair of even/odd registers is needed by an instruction, a cloned register is created, such that the value of the even/odd register pair is available as a single word for accessing. A map is maintained as to which register pairs are accessible as a single word. In one embodiment, the even/odd registers are implemented as a subset of a wider register.

In one embodiment, in instruction decode, the validity of a pairing is tracked. With 16 FPRs, the pairs can be tracked with just 8 bits of hardware state. If any instruction that does not use the pair modifies either FPR value, then the pairing is broken. If pairing remains intact, an operand read can happen from a full vector register instead of register pair. If pairing is broken, then the usual two reads are performed and merged into a wide value to be written back to the register file for future use. During speculative execution, the bits can either be cleared or restored from a save area on a rewind.

Further aspects relating to register pairs are described in the following co-pending, commonly owned patent applications: U.S. Ser. No. 13/552,099, entitled "Reducing Register Read Ports for Register Pairs," filed Jul. 18, 2012; U.S. Ser. No. 13/552,108, entitled "Predicting Register Pairs," filed Jul. 18, 2012; and U.S. Ser. No. 13/552,109, entitled "Managing Register Pairing," filed Jul. 18, 2012, each of which is hereby incorporated herein by reference in its entirety.

Herein, memory, main memory, storage and main storage are used interchangeably, unless otherwise noted explicitly or by context.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device (s) having computer readable program code embodied thereon.

One or more of the capabilities of embodiments can be implemented in software, firmware, hardware, or some combination thereof. Further, one or more of the capabilities can be emulated.

Figure 16:
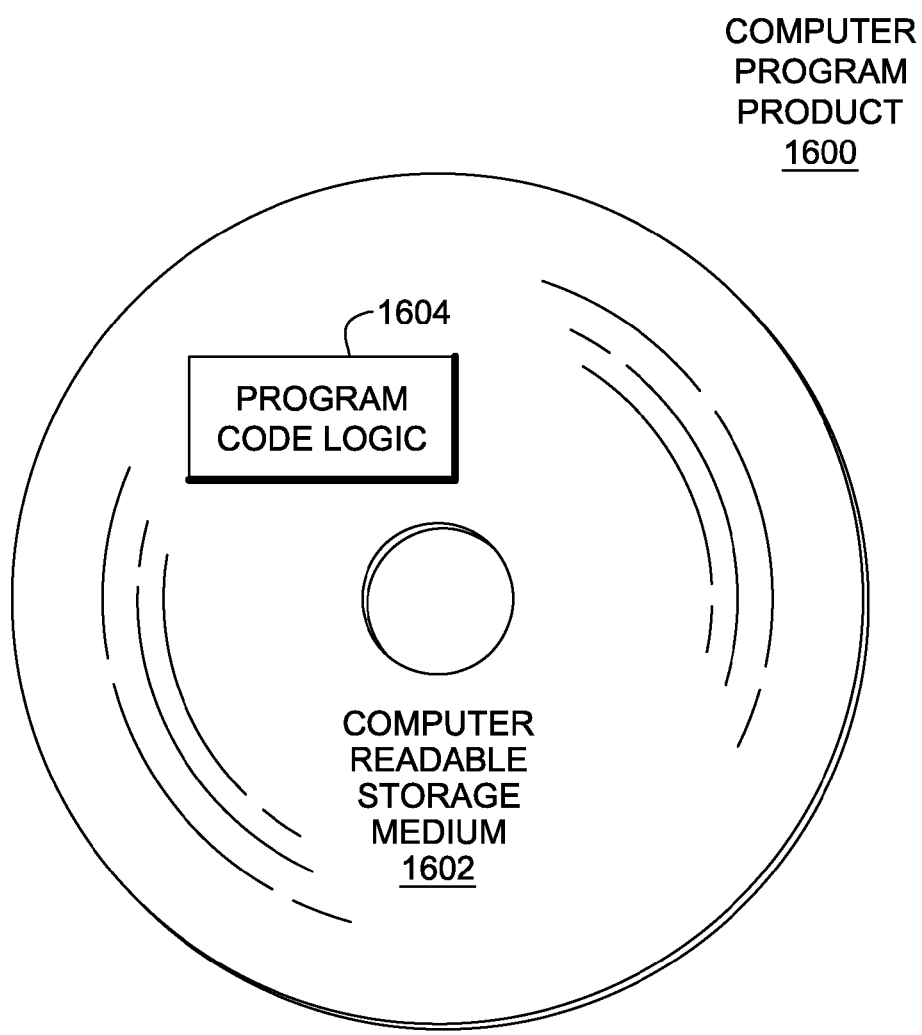
FIG. 16 depicts one embodiment of a computer program product incorporating one or more aspects.

Referring to FIG. 16, one or more aspects of embodiments can be included in an article of manufacture (e.g., one or more computer program products 1600) having, for instance, computer readable storage media 1602. The media has embodied therein, for instance, computer readable program code (instructions) 1604 to provide and facilitate the capabilities of embodiments. The article of manufacture can be included as a part of a computer system or as a separate product.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM).

Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

For instance, an application may be deployed for performing one or more aspects. As one example, the deploying of an application comprises providing computer infrastructure operable to perform one or more aspects.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects. Further, registers of other sizes may be used, and changes to the instructions may be made without departing from the spirit of the embodiments.

Further, other types of computing environments can benefit from one or more aspects. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 17:
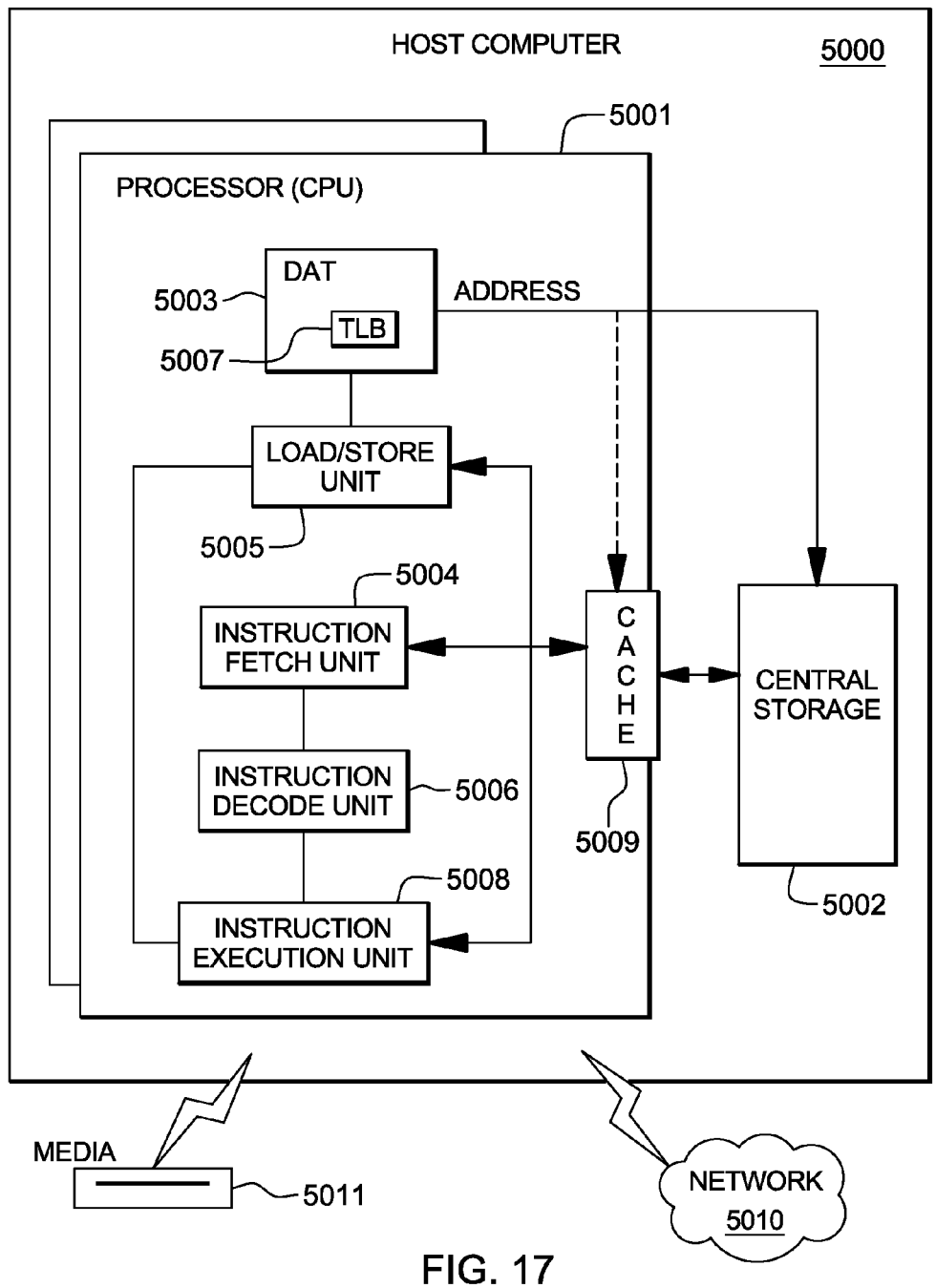
FIG. 17 depicts one embodiment of a host computer system to incorporate and use one or more aspects.

Referring to FIG. 17, representative components of a Host Computer system 5000 to implement one or more aspects are portrayed. The representative host computer 5000 comprises one or more CPUs 5001 in communication with computer memory (i.e., central storage) 5002, as well as I/O interfaces to storage media devices 5011 and networks 5010 for communicating with other computers or SANs and the like. The CPU 5001 is compliant with an architecture having an architected instruction set and architected functionality. The CPU 5001 may have dynamic address translation (DAT) 5003 for transforming program addresses (virtual addresses) into real addresses of memory. A DAT typically includes a translation lookaside buffer (TLB) 5007 for caching translations so that later accesses to the block of computer memory 5002 do not require the delay of address translation. Typically, a cache 5009 is employed between computer memory 5002 and the processor 5001. The cache 5009 may be hierarchical having a large cache available to more than one CPU and smaller, faster (lower level) caches between the large cache and each CPU. In some implementations, the lower level caches are split to provide separate low level caches for instruction fetching and data accesses. In one embodiment, an instruction is fetched from memory 5002 by an instruction fetch unit 5004 via a cache 5009. The instruction is decoded in an instruction decode unit 5006 and dispatched (with other instructions in some embodiments) to instruction execution unit or units 5008. Typically several execution units 5008 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 5002, a load/store unit 5005 typically handles the access under control of the instruction being executed. Instructions may be executed in hardware circuits or in internal microcode (firmware) or by a combination of both.

As noted, a computer system includes information in local (or main) storage, as well as addressing, protection, and reference and change recording. Some aspects of addressing include the format of addresses, the concept of address spaces, the various types of addresses, and the manner in which one type of address is translated to another type of address. Some of main storage includes permanently assigned storage locations. Main storage provides the system with directly addressable fast-access storage of data. Both data and programs are to be loaded into main storage (from input devices) before they can be processed.

Main storage may include one or more smaller, faster-access buffer storages, sometimes called caches. A cache is typically physically associated with a CPU or an I/O processor. The effects, except on performance, of the physical construction and use of distinct storage media are generally not observable by the program.

Separate caches may be maintained for instructions and for data operands. Information within a cache is maintained in contiguous bytes on an integral boundary called a cache block or cache line (or line, for short). A model may provide an EXTRACT CACHE ATTRIBUTE instruction which returns the size of a cache line in bytes. A model may also provide PREFETCH DATA and PREFETCH DATA RELATIVE LONG instructions which effects the prefetching of storage into the data or instruction cache or the releasing of data from the cache.

Storage is viewed as a long horizontal string of bits. For most operations, accesses to storage proceed in a left-to-right sequence. The string of bits is subdivided into units of eight bits. An eight-bit unit is called a byte, which is the basic building block of all information formats. Each byte location in storage is identified by a unique nonnegative integer, which is the address of that byte location or, simply, the byte address. Adjacent byte locations have consecutive addresses, starting with 0 on the left and proceeding in a left-to-right sequence. Addresses are unsigned binary integers and are 24, 31, or 64 bits.

Information is transmitted between storage and a CPU or a channel subsystem one byte, or a group of bytes, at a time. Unless otherwise specified, in, for instance, the z/Architecture, a group of bytes in storage is addressed by the leftmost byte of the group. The number of bytes in the group is either implied or explicitly specified by the operation to be performed. When used in a CPU operation, a group of bytes is called a field. Within each group of bytes, in, for instance, the z/Architecture, bits are numbered in a left-to-right sequence. In the z/Architecture, the leftmost bits are sometimes referred to as the "high-order" bits and the rightmost bits as the "low-order" bits. Bit numbers are not storage addresses, however. Only bytes can be addressed. To operate on individual bits of a byte in storage, the entire byte is accessed. The bits in a byte are numbered 0 through 7, from left to right (in, e.g., the z/Architecture). The bits in an address may be numbered 8-31 or 40-63 for 24-bit addresses, or 1-31 or 33-63 for 31-bit addresses; they are numbered 0-63 for 64-bit addresses. Within any other fixed-length format of multiple bytes, the bits making up the format are consecutively numbered starting from 0. For purposes of error detection, and in preferably for correction, one or more check bits may be transmitted with each byte or with a group of bytes. Such check bits are generated automatically by the machine and cannot be directly controlled by the program. Storage capacities are expressed in number of bytes. When the length of a storage-operand field is implied by the operation code of an instruction, the field is said to have a fixed length, which can be one, two, four, eight, or sixteen bytes. Larger fields may be implied for some instructions. When the length of a storage-operand field is not implied but is stated explicitly, the field is said to have a variable length. Variable-length operands can vary in length by increments of one byte (or with some instructions, in multiples of two bytes or other multiples). When information is placed in storage, the contents of only those byte locations are replaced that are included in the designated field, even though the width of the physical path to storage may be greater than the length of the field being stored.

Certain units of information are to be on an integral boundary in storage. A boundary is called integral for a unit of information when its storage address is a multiple of the length of the unit in bytes. Special names are given to fields of 2, 4, 8, and 16 bytes on an integral boundary. A halfword is a group of two consecutive bytes on a two-byte boundary and is the basic building block of instructions. A word is a group of four consecutive bytes on a four-byte boundary. A doubleword is a group of eight consecutive bytes on an eight-byte boundary. A quadword is a group of 16 consecutive bytes on a 16-byte boundary. When storage addresses designate halfwords, words, doublewords, and quadwords, the binary representation of the address contains one, two, three, or four rightmost zero bits, respectively. Instructions are to be on two-byte integral boundaries. The storage operands of most instructions do not have boundary-alignment requirements.

On devices that implement separate caches for instructions and data operands, a significant delay may be experienced if the program stores into a cache line from which instructions are subsequently fetched, regardless of whether the store alters the instructions that are subsequently fetched.

In one embodiment, one or more aspects may be practiced by software (sometimes referred to licensed internal code, firmware, micro-code, milli-code, pico-code and the like, any of which would be consistent with one or more aspects). Referring to FIG. 17, software program code which embodies one or more aspects may be accessed by processor 5001 of the host system 5000 from long-term storage media devices 5011, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from computer memory 5002 or storage of one computer system over a network 5010 to other computer systems for use by users of such other systems.

The software program code includes an operating system which controls the function and interaction of the various computer components and one or more application programs. Program code is normally paged from storage media device 5011 to the relatively higher-speed computer storage 5002 where it is available for processing by processor 5001. The techniques and methods for embodying software program code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

Figure 18:
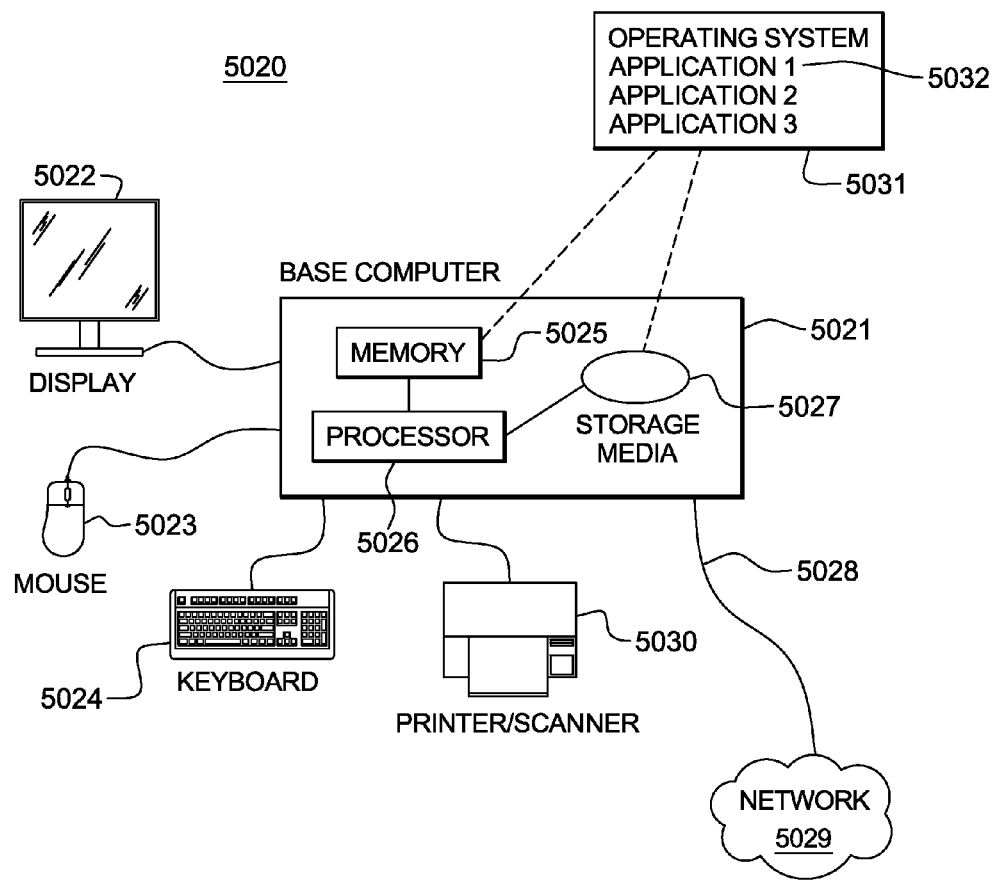
FIG. 18 depicts a further example of a computer system to incorporate and use one or more aspects.

FIG. 18 illustrates a representative workstation or server hardware system in which one or more aspects may be practiced. The system 5020 of FIG. 18 comprises a representative base computer system 5021, such as a personal computer, a workstation or a server, including optional peripheral devices. The base computer system 5021 includes one or more processors 5026 and a bus employed to connect and enable communication between the processor(s) 5026 and the other components of the system 5021 in accordance with known techniques. The bus connects the processor 5026 to memory 5025 and long-term storage 5027 which can include a hard drive (including any of magnetic media, CD, DVD and Flash Memory for example) or a tape drive for example. The system 5021 might also include a user interface adapter, which connects the microprocessor 5026 via the bus to one or more interface devices, such as a keyboard 5024, a mouse 5023, a printer/scanner 5030 and/or other interface devices, which can be any user interface device, such as a touch sensitive screen, digitized entry pad, etc. The bus also connects a display device 5022, such as an LCD screen or monitor, to the microprocessor 5026 via a display adapter.

The system 5021 may communicate with other computers or networks of computers by way of a network adapter capable of communicating 5028 with a network 5029. Example network adapters are communications channels, token ring, Ethernet or modems. Alternatively, the system 5021 may communicate using a wireless interface, such as a CDPD (cellular digital packet data) card. The system 5021 may be associated with such other computers in a Local Area Network (LAN) or a Wide Area Network (WAN), or the system 5021 can be a client in a client/server arrangement with another computer, etc. All of these configurations, as well as the appropriate communications hardware and software, are known in the art.

Figure 19:
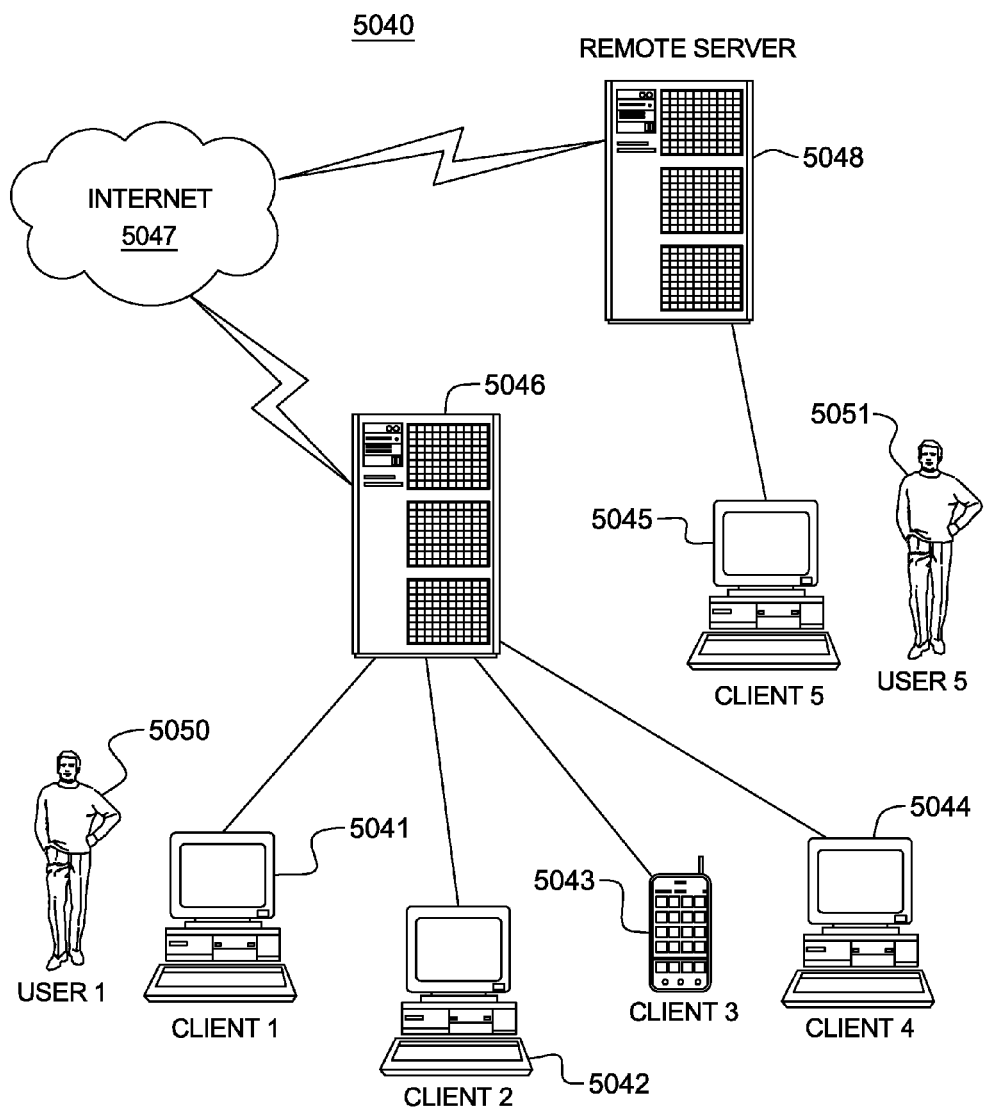
FIG. 19 depicts another example of a computer system comprising a computer network to incorporate and use one or more aspects.

FIG. 19 illustrates a data processing network 5040 in which one or more aspects may be practiced. The data processing network 5040 may include a plurality of individual networks, such as a wireless network and a wired network, each of which may include a plurality of individual workstations 5041, 5042, 5043, 5044. Additionally, as those skilled in the art will appreciate, one or more LANs may be included, where a LAN may comprise a plurality of intelligent workstations coupled to a host processor.

Still referring to FIG. 19, the networks may also include mainframe computers or servers, such as a gateway computer (client server 5046) or application server (remote server 5048 which may access a data repository and may also be accessed directly from a workstation 5045). A gateway computer 5046 serves as a point of entry into each individual network. A gateway is needed when connecting one networking protocol to another. The gateway 5046 may be preferably coupled to another network (the Internet 5047 for example) by means of a communications link. The gateway 5046 may also be directly coupled to one or more workstations 5041, 5042, 5043, 5044 using a communications link. The gateway computer may be implemented utilizing an IBM eServer™ System z server available from International Business Machines Corporation.

Referring concurrently to FIG. 18 and FIG. 19, software programming code which may embody one or more aspects may be accessed by the processor 5026 of the system 5020 from long-term storage media 5027, such as a CD-ROM drive or hard drive. The software programming code may be embodied on any of a variety of known media for use with a data processing system, such as a diskette, hard drive, or CD-ROM. The code may be distributed on such media, or may be distributed to users 5050, 5051 from the memory or storage of one computer system over a network to other computer systems for use by users of such other systems.

Alternatively, the programming code may be embodied in the memory 5025, and accessed by the processor 5026 using the processor bus. Such programming code includes an operating system which controls the function and interaction of the various computer components and one or more application programs 5032. Program code is normally paged from storage media 5027 to high-speed memory 5025 where it is available for processing by the processor 5026. The techniques and methods for embodying software programming code in memory, on physical media, and/or distributing software code via networks are well known and will not be further discussed herein. Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit.

The cache that is most readily available to the processor (normally faster and smaller than other caches of the processor) is the lowest (L1 or level one) cache and main store (main memory) is the highest level cache (L3 if there are 3 levels). The lowest level cache is often divided into an instruction cache (I-Cache) holding machine instructions to be executed and a data cache (D-Cache) holding data operands.

Figure 20:
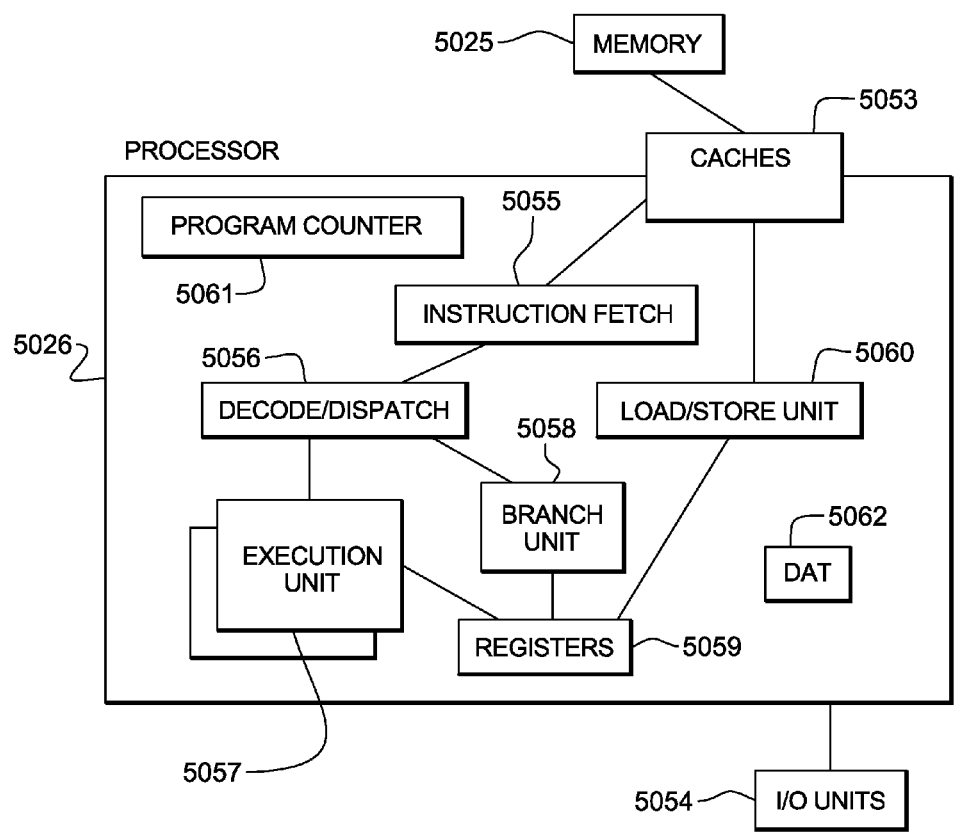
FIG. 20 depicts one embodiment of various elements of a computer system to incorporate and use one or more aspects.

Referring to FIG. 20, an exemplary processor embodiment is depicted for processor 5026. Typically one or more levels of cache 5053 are employed to buffer memory blocks in order to improve processor performance. The cache 5053 is a high speed buffer holding cache lines of memory data that are likely to be used. Typical cache lines are 64, 128 or 256 bytes of memory data. Separate caches are often employed for caching instructions than for caching data. Cache coherence (synchronization of copies of lines in memory and the caches) is often provided by various "snoop" algorithms well known in the art. Main memory storage 5025 of a processor system is often referred to as a cache. In a processor system having 4 levels of cache 5053, main storage 5025 is sometimes referred to as the level 5 (L5) cache since it is typically faster and only holds a portion of the non-volatile storage (DASD, tape etc) that is available to a computer system. Main storage 5025 "caches" pages of data paged in and out of the main storage 5025 by the operating system.

A program counter (instruction counter) 5061 keeps track of the address of the current instruction to be executed. A program counter in a z/Architecture processor is 64 bits and can be truncated to 31 or 24 bits to support prior addressing limits. A program counter is typically embodied in a PSW (program status word) of a computer such that it persists during context switching. Thus, a program in progress, having a program counter value, may be interrupted by, for example, the operating system (context switch from the program environment to the operating system environment). The PSW of the program maintains the program counter value while the program is not active, and the program counter (in the PSW) of the operating system is used while the operating system is executing. Typically, the program counter is incremented by an amount equal to the number of bytes of the current instruction. RISC (Reduced Instruction Set Computing) instructions are typically fixed length while CISC (Complex Instruction Set Computing) instructions are typically variable length. Instructions of the IBM z/Architecture are CISC instructions having a length of 2, 4 or 6 bytes. The Program counter 5061 is modified by either a context switch operation or a branch taken operation of a branch instruction for example. In a context switch operation, the current program counter value is saved in the program status word along with other state information about the program being executed (such as condition codes), and a new program counter value is loaded pointing to an instruction of a new program module to be executed. A branch taken operation is performed in order to permit the program to make decisions or loop within the program by loading the result of the branch instruction into the program counter 5061.

Typically an instruction fetch unit 5055 is employed to fetch instructions on behalf of the processor 5026. The fetch unit either fetches "next sequential instructions", target instructions of branch taken instructions, or first instructions of a program following a context switch. Modern Instruction fetch units often employ prefetch techniques to speculatively prefetch instructions based on the likelihood that the prefetched instructions might be used. For example, a fetch unit may fetch 16 bytes of instruction that includes the next sequential instruction and additional bytes of further sequential instructions.

The fetched instructions are then executed by the processor 5026. In an embodiment, the fetched instruction(s) are passed to a dispatch unit 5056 of the fetch unit. The dispatch unit decodes the instruction(s) and forwards information about the decoded instruction(s) to appropriate units 5057, 5058, 5060. An execution unit 5057 will typically receive information about decoded arithmetic instructions from the instruction fetch unit 5055 and will perform arithmetic operations on operands according to the opcode of the instruction. Operands are provided to the execution unit 5057 preferably either from memory 5025, architected registers 5059 or from an immediate field of the instruction being executed. Results of the execution, when stored, are stored either in memory 5025, registers 5059 or in other machine hardware (such as control registers, PSW registers and the like).

Figure 21A:
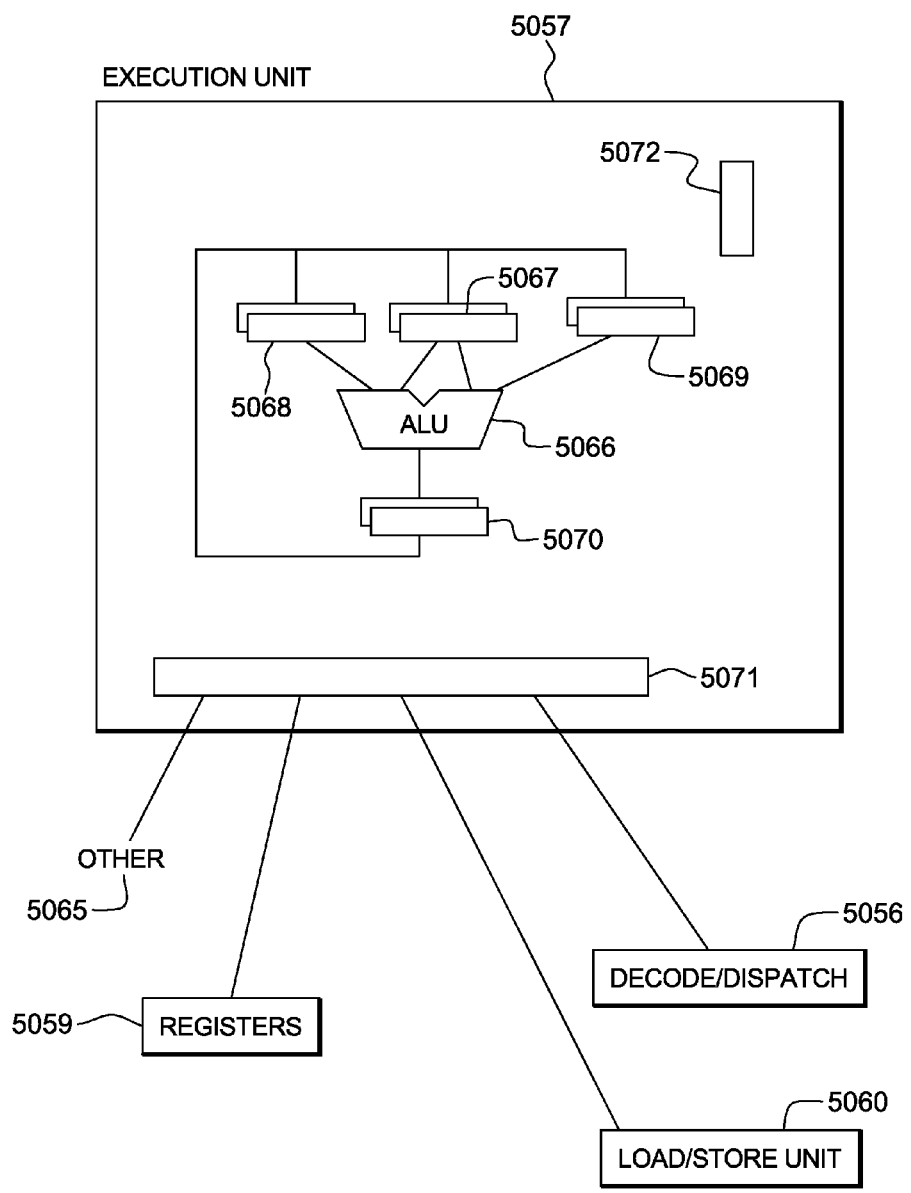
FIG. 21A depicts one embodiment of the execution unit of the computer system of FIG. 20.

A processor 5026 typically has one or more units 5057, 5058, 5060 for executing the function of the instruction. Referring to FIG. 21A, an execution unit 5057 may communicate with architected general registers 5059, a decode/dispatch unit 5056, a load store unit 5060, and other 5065 processor units by way of interfacing logic 5071. An execution unit 5057 may employ several register circuits 5067, 5068, 5069 to hold information that the arithmetic logic unit (ALU) 5066 will operate on. The ALU performs arithmetic operations such as add, subtract, multiply and divide as well as logical function such as and, or and exclusive-or (XOR), rotate and shift. Preferably the ALU supports specialized operations that are design dependent. Other circuits may provide other architected facilities 5072 including condition codes and recovery support logic for example. Typically the result of an ALU operation is held in an output register circuit 5070 which can forward the result to a variety of other processing functions. There are many arrangements of processor units, the present description is only intended to provide a representative understanding of one embodiment.

An ADD instruction for example would be executed in an execution unit 5057 having arithmetic and logical functionality while a floating point instruction for example would be executed in a floating point execution having specialized floating point capability. Preferably, an execution unit operates on operands identified by an instruction by performing an opcode defined function on the operands. For example, an ADD instruction may be executed by an execution unit 5057 on operands found in two registers 5059 identified by register fields of the instruction.

The execution unit 5057 performs the arithmetic addition on two operands and stores the result in a third operand where the third operand may be a third register or one of the two source registers. The execution unit preferably utilizes an Arithmetic Logic Unit (ALU) 5066 that is capable of performing a variety of logical functions such as Shift, Rotate, And, Or and XOR as well as a variety of algebraic functions including any of add, subtract, multiply, divide. Some ALUs 5066 are designed for scalar operations and some for floating point. Data may be Big Endian (where the least significant byte is at the highest byte address) or Little Endian (where the least significant byte is at the lowest byte address) depending on architecture. The IBM z/Architecture is Big Endian. Signed fields may be sign and magnitude, 1's complement or 2's complement depending on architecture. A 2's complement number is advantageous in that the ALU does not need to design a subtract capability since either a negative value or a positive value in 2's complement requires only an addition within the ALU. Numbers are commonly described in shorthand, where a 12 bit field defines an address of a 4,096 byte block and is commonly described as a 4 Kbyte (Kilo-byte) block, for example.

Figure 21B:
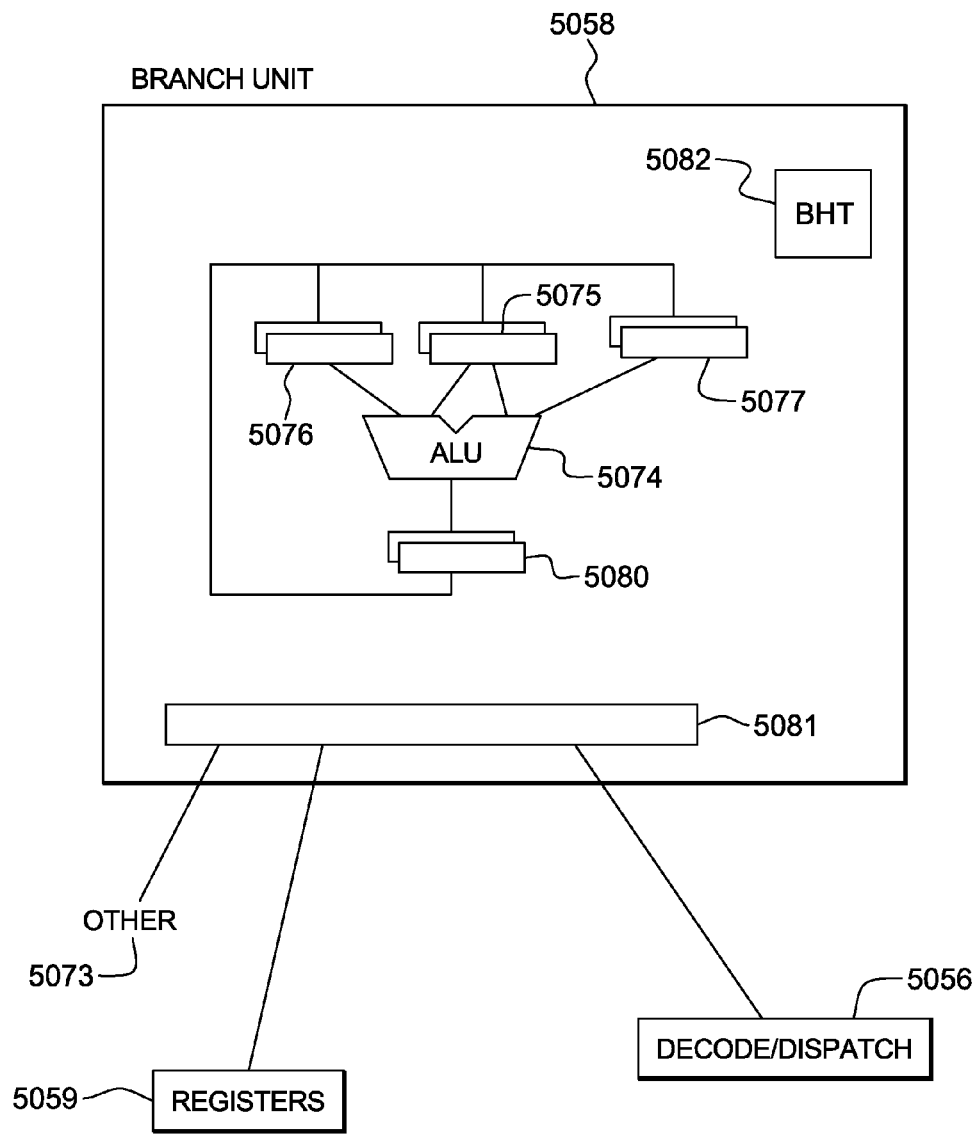
FIG. 21B depicts one embodiment of the branch unit of the computer system of FIG. 20.

Referring to FIG. 21B, branch instruction information for executing a branch instruction is typically sent to a branch unit 5058 which often employs a branch prediction algorithm such as a branch history table 5082 to predict the outcome of the branch before other conditional operations are complete. The target of the current branch instruction will be fetched and speculatively executed before the conditional operations are complete. When the conditional operations are completed the speculatively executed branch instructions are either completed or discarded based on the conditions of the conditional operation and the speculated outcome. A typical branch instruction may test condition codes and branch to a target address if the condition codes meet the branch requirement of the branch instruction, a target address may be calculated based on several numbers including ones found in register fields or an immediate field of the instruction for example. The branch unit 5058 may employ an ALU 5074 having a plurality of input register circuits 5075, 5076, 5077 and an output register circuit 5080. The branch unit 5058 may communicate with general registers 5059, decode dispatch unit 5056 or other circuits 5073, for example.

The execution of a group of instructions can be interrupted for a variety of reasons including a context switch initiated by an operating system, a program exception or error causing a context switch, an I/O interruption signal causing a context switch or multi-threading activity of a plurality of programs (in a multi-threaded environment), for example. Preferably a context switch action saves state information about a currently executing program and then loads state information about another program being invoked. State information may be saved in hardware registers or in memory for example. State information preferably comprises a program counter value pointing to a next instruction to be executed, condition codes, memory translation information and architected register content. A context switch activity can be exercised by hardware circuits, application programs, operating system programs or firmware code (microcode, pico-code or licensed internal code (LIC)) alone or in combination.

A processor accesses operands according to instruction defined methods. The instruction may provide an immediate operand using the value of a portion of the instruction, may provide one or more register fields explicitly pointing to either general purpose registers or special purpose registers (floating point registers for example). The instruction may utilize implied registers identified by an opcode field as operands. The instruction may utilize memory locations for operands. A memory location of an operand may be provided by a register, an immediate field, or a combination of registers and immediate field as exemplified by the z/Architecture long displacement facility wherein the instruction defines a base register, an index register and an immediate field (displacement field) that are added together to provide the address of the operand in memory for example. Location herein typically implies a location in main memory (main storage) unless otherwise indicated.

Figure 21C:
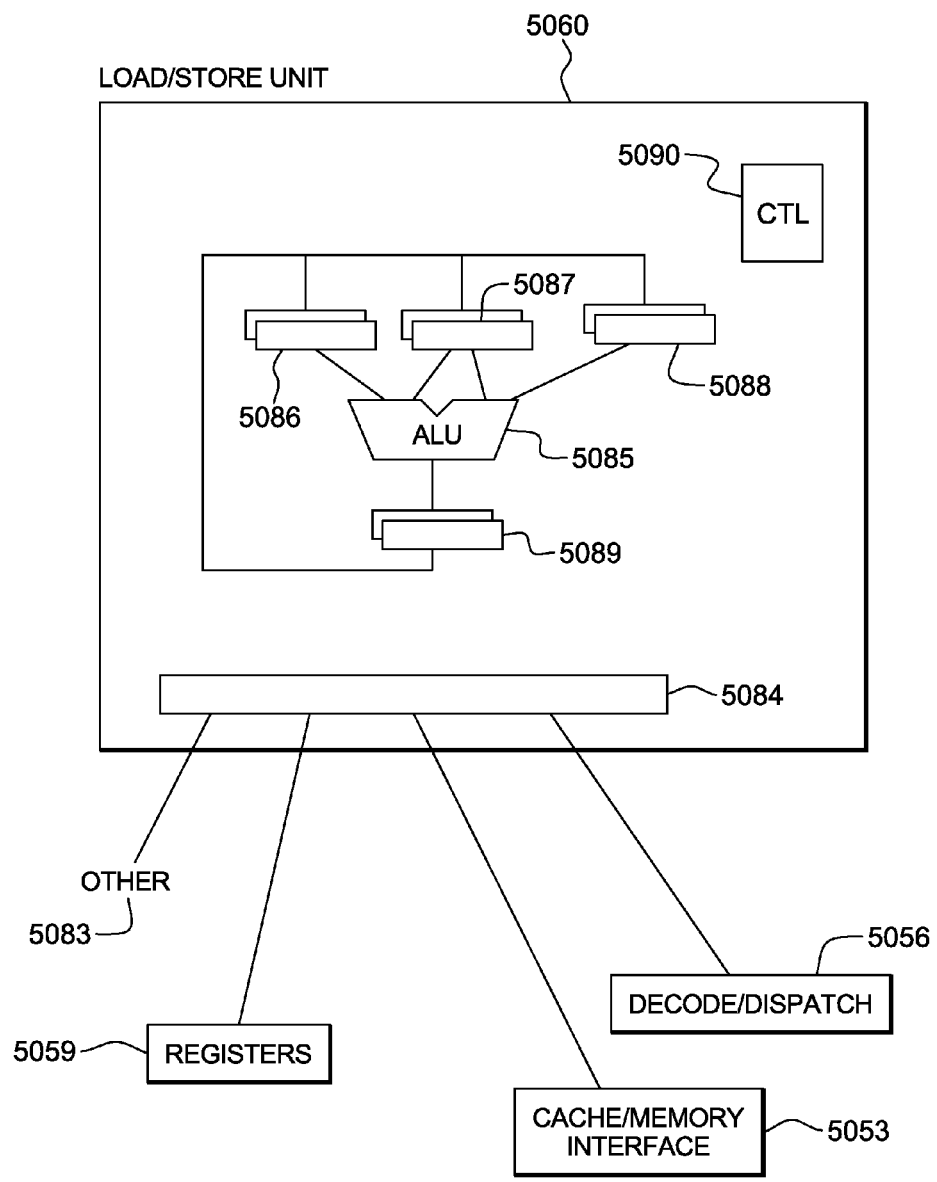
FIG. 21C depicts one embodiment of the load/store unit of the computer system of FIG. 20.

Referring to FIG. 21C, a processor accesses storage using a load/store unit 5060. The load/store unit 5060 may perform a load operation by obtaining the address of the target operand in memory 5053 and loading the operand in a register 5059 or another memory 5053 location, or may perform a store operation by obtaining the address of the target operand in memory 5053 and storing data obtained from a register 5059 or another memory 5053 location in the target operand location in memory 5053. The load/store unit 5060 may be speculative and may access memory in a sequence that is out-of-order relative to instruction sequence, however the load/store unit 5060 is to maintain the appearance to programs that instructions were executed in order. A load/store unit 5060 may communicate with general registers 5059, decode/dispatch unit 5056, cache/memory interface 5053 or other elements 5083 and comprises various register circuits, ALUs 5085 and control logic 5090 to calculate storage addresses and to provide pipeline sequencing to keep operations in-order. Some operations may be out of order but the load/store unit provides functionality to make the out of order operations to appear to the program as having been performed in order, as is well known in the art.

Preferably addresses that an application program "sees" are often referred to as virtual addresses. Virtual addresses are sometimes referred to as "logical addresses" and "effective addresses". These virtual addresses are virtual in that they are redirected to physical memory location by one of a variety of dynamic address translation (DAT) technologies including, but not limited to, simply prefixing a virtual address with an offset value, translating the virtual address via one or more translation tables, the translation tables preferably comprising at least a segment table and a page table alone or in combination, preferably, the segment table having an entry pointing to the page table. In the z/Architecture, a hierarchy of translation is provided including a region first table, a region second table, a region third table, a segment table and an optional page table. The performance of the address translation is often improved by utilizing a translation lookaside buffer (TLB) which comprises entries mapping a virtual address to an associated physical memory location. The entries are created when the DAT translates a virtual address using the translation tables. Subsequent use of the virtual address can then utilize the entry of the fast TLB rather than the slow sequential translation table accesses. TLB content may be managed by a variety of replacement algorithms including LRU (Least Recently used).

In the case where the processor is a processor of a multi-processor system, each processor has responsibility to keep shared resources, such as I/O, caches, TLBs and memory, interlocked for coherency. Typically, "snoop" technologies will be utilized in maintaining cache coherency. In a snoop environment, each cache line may be marked as being in any one of a shared state, an exclusive state, a changed state, an invalid state and the like in order to facilitate sharing.

I/O units 5054 (FIG. 20) provide the processor with means for attaching to peripheral devices including tape, disc, printers, displays, and networks for example. I/O units are often presented to the computer program by software drivers. In mainframes, such as the System z® from IBM®, channel adapters and open system adapters are I/O units of the mainframe that provide the communications between the operating system and peripheral devices.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

More particularly, in a mainframe, architected machine instructions are used by programmers, usually today "C" programmers, often by way of a compiler application. These instructions stored in the storage medium may be executed natively in a z/Architecture IBM® Server, or alternatively in machines executing other architectures. They can be emulated in the existing and in future IBM® mainframe servers and on other machines of IBM® (e.g., Power Systems servers and System x® Servers). They can be executed in machines running Linux on a wide variety of machines using hardware manufactured by IBM®, Intel®, AMD™, and others. Besides execution on that hardware under a z/Architecture, Linux can be used as well as machines which use emulation by Hercules, UMX, or FSI (Fundamental Software, Inc), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software is to maintain the architecture rules of the emulated processor architecture so as to assure operating systems and applications written for the emulated processor operate correctly. Furthermore, the emulation software is to provide resources identified by the emulated processor architecture including, but not limited to, control registers, general purpose registers, floating point registers, dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine is called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013, entitled "Multiprocessor for Hardware Emulation", by Beausoleil et al.; and U.S. Pat. No. 6,009,261, entitled "Preprocessing of Stored Target Routines for Emulating Incompatible Instructions on a Target Processor", by Scalzi et al; and U.S. Pat. No. 5,574,873, entitled "Decoding Guest Instruction to Directly Access Emulation Routines that Emulate the Guest Instructions", by Davidian et al; and U.S. Pat. No. 6,308,255, entitled "Symmetrical Multiprocessing Bus and Chipset Used for Coprocessor Support Allowing Non-Native Code to Run in a System", by Gorishek et al; and U.S. Pat. No. 6,463,582, entitled "Dynamic Optimizing Object Code Translator for Architecture Emulation and Dynamic Optimizing Object Code Translation Method", by Lethin et al; and U.S. Pat. No. 5,790,825, entitled "Method for Emulating Guest Instructions on a Host Computer Through Dynamic Recompilation of Host Instructions", by Eric Traut, each of which is hereby incorporated herein by reference in its entirety; and many others, illustrate a variety of known ways to achieve emulation of an instruction format architected for a different machine for a target machine available to those skilled in the art.

Figure 22:
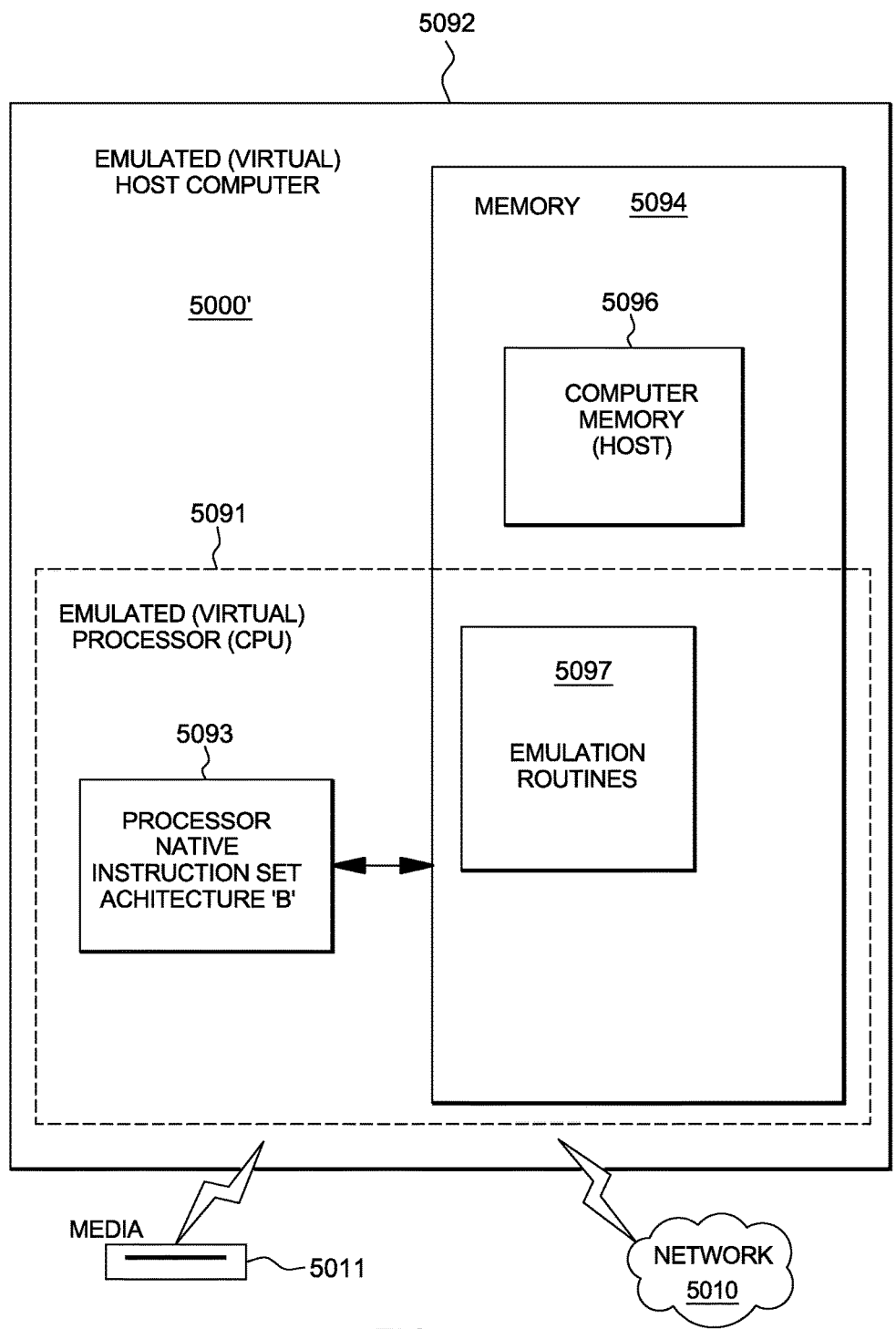
FIG. 22 depicts one embodiment of an emulated host computer system.

In FIG. 22, an example of an emulated host computer system 5092 is provided that emulates a host computer system 5000' of a host architecture. In the emulated host computer system 5092, the host processor (CPU) 5091 is an emulated host processor (or virtual host processor) and comprises an emulation processor 5093 having a different native instruction set architecture than that of the processor 5091 of the host computer 5000'. The emulated host computer system 5092 has memory 5094 accessible to the emulation processor 5093. In the example embodiment, the memory 5094 is partitioned into a host computer memory 5096 portion and an emulation routines 5097 portion. The host computer memory 5096 is available to programs of the emulated host computer 5092 according to host computer architecture. The emulation processor 5093 executes native instructions of an architected instruction set of an architecture other than that of the emulated processor 5091, the native instructions obtained from emulation routines memory 5097, and may access a host instruction for execution from a program in host computer memory 5096 by employing one or more instruction(s) obtained in a sequence & access/decode routine which may decode the host instruction(s) accessed to determine a native instruction execution routine for emulating the function of the host instruction accessed. Other facilities that are defined for the host computer system 5000' architecture may be emulated by architected facilities routines, including such facilities as general purpose registers, control registers, dynamic address translation and I/O subsystem support and processor cache, for example. The emulation routines may also take advantage of functions available in the emulation processor 5093 (such as general registers and dynamic translation of virtual addresses) to improve performance of the emulation routines. Special hardware and off-load engines may also be provided to assist the processor 5093 in emulating the function of the host computer 5000'.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects has been presented for purposes of illustration and description, but is not intended to be exhaustive or limited to the invention in the form disclosed. Many modifications and variations will be apparent to those of ordinary skill in the art without departing from the scope and spirit of one or more aspects. The embodiment was chosen and described in order to best explain the principles of one or more aspects and the practical application, and to enable others of ordinary skill in the art to understand the various embodiments with various modifications as are suited to the particular use contemplated.

What is claimed is:

1. A method of facilitating read operations, said method comprising:
   initiating a read operation to obtain a wide input operand, the initiating being based on processing of an instruction, the instruction specifying the wide input operand, and wherein the processing the instruction comprises decoding the instruction, the decoding comprising:

deciding whether the wide input operand corresponds to a register file where wide registers overlay narrow registers;

deciding whether the instruction uses multiple narrow registers, the multiple narrow registers comprising at least one pair of registers;

checking whether a pair of registers to provide the wide input operand is a known pair of registers, wherein a known pair of registers is a register pair where status is known to be paired, and based on the checking indicating the status is unknown, checking whether the pair of registers is known to be not paired, wherein based on the pair of registers not known to be not paired, the status is set to paired; and determining whether a value in a wide register corresponding to the multiple narrow registers corresponds to a value in the multiple narrow registers, the determining comprising checking a selected pairing indicator of a plurality of pairing indicators in a tracking module, the tracking module comprising a pairing indicator per paired multiple narrow registers, wherein the selected pairing indicator being set to a defined value indicates the value in the wide register corresponds to the value in the multiple narrow registers, the selected pairing indicator including status of the pair of registers;

based on deciding that the wide input operand corresponds to a register file where wide registers overlay narrow registers, the instruction uses multiple narrow registers, and the value in the wide register, as indicated via the selected pairing indicator, does not correspond to the value in the multiple narrow registers, merging at least a portion of contents of the multiple narrow registers to obtain merged contents, writing the merged contents into the wide register, and continuing the read operation to obtain the wide input operand; and based on deciding that the wide input operand corresponds to a register file where wide registers overlay narrow registers, the instruction uses multiple narrow registers, and the value in the wide register, as indicated via the selected pairing indicator, does correspond to the value in the multiple narrow registers, obtaining the wide input operand from the wide register.

2. The method of claim 1, wherein the continuing the read operation comprises using the merged contents to obtain the wide input operand absent a reading of the wide register.

3. The method of claim 1, wherein the continuing the read operation comprises reading the wide register to obtain the wide input operand.

4. The method of claim 1, wherein the multiple narrow registers comprise a pair of named registers, and wherein the wide register corresponds to the pair of named registers.

5. The method of claim 1, further comprising based on the merging, setting a corresponding pairing indicator in the tracking module specifying the merging of the at least a portion of the contents of the multiple narrow registers.

6. The method of claim 1, further comprising performing another read operation, the another read operation obtaining the wide input operand from the wide register, instead of performing the merging and the writing.

7. The method of claim 1, wherein the multiple narrow registers comprises two narrow registers, and the merging comprises:

obtaining two physical registers corresponding to the two narrow registers, the two narrow registers being logical registers;

allocating a new physical register;

merging at least a portion of the contents of the two physical registers to obtain the merged contents, the at least a portion of the contents of the two physical registers corresponding to the at least a portion of the contents of the two narrow registers; and writing the merged contents to the new physical register, the new physical register comprising the wide register.

8. The method of claim 1, wherein the plurality of pairing indicators is part of a pairing vector.

* * * * *